United States Patent
Sankaran et al.

(10) Patent No.: US 12,099,962 B2
(45) Date of Patent: Sep. 24, 2024

(54) METHODS AND SYSTEMS FOR DETECTING DELIVERY TRIP EVENTS AND IMPROVING DELIVERY DRIVER SAFETY

(71) Applicant: Yum Connect, LLC, Louisville, KY (US)

(72) Inventors: Ananda Sankaran, Plano, TX (US); Tiffany Buettner, Plano, TX (US); Taniya Riar, Plano, TX (US); Alex Kuznicki, Plano, TX (US); Munawer Baig, Plano, TX (US)

(73) Assignee: Yum Connect, LLC, Louisville, KY (US)

( * ) Notice: Subject to any disclaimer, the term of this patent is extended or adjusted under 35 U.S.C. 154(b) by 337 days.

(21) Appl. No.: 17/559,922

(22) Filed: Dec. 22, 2021

(65) Prior Publication Data

US 2022/0210621 A1    Jun. 30, 2022

Related U.S. Application Data

(60) Provisional application No. 63/133,197, filed on Dec. 31, 2020.

(51) Int. Cl.
*G06Q 10/0833* (2023.01)
*G06Q 30/0601* (2023.01)
(Continued)

(52) U.S. Cl.
CPC ..... *G06Q 10/0833* (2013.01); *G06Q 30/0635* (2013.01); *G06Q 50/40* (2024.01);
(Continued)

(58) Field of Classification Search
CPC ......... H04W 4/38; H04W 4/029; H04W 4/35; H04W 4/027; H04W 4/48; H04W 4/40;
(Continued)

(56) References Cited

U.S. PATENT DOCUMENTS

| | | | |
|---|---|---|---|
| 6,411,891 B1 * | 6/2002 | Jones | G06Q 10/08 455/12.1 |
| 10,445,758 B1 * | 10/2019 | Bryer | G06Q 40/08 |

(Continued)

OTHER PUBLICATIONS

USPTO Notice of Allowance issued Aug. 16, 2023 regarding U.S. Appl. No. 17/559,937, 18 pages.
(Continued)

*Primary Examiner* — Dung Hong
(74) *Attorney, Agent, or Firm* — Foley & Lardner LLP

(57) ABSTRACT

Systems and methods for detecting predetermined events occurring during delivery of an ordered product to a delivery address is provided. Upon receipt of a customer order, delivery of the ordered product is assigned to a delivery driver/vehicle which includes a stand-alone communication device disposed in the delivery vehicle. As the delivery trip begins, various position and acceleration information is collected by the communication device, processed to determine whether a predetermined driving event has occurred, and stored. This information is transmitted periodically to a processing system for eventual communication to a home location store associated with the delivery order. Additional processing of the delivery trip data may occur to enable a review of the delivery trip and any detected events along the delivery path.

12 Claims, 12 Drawing Sheets

(51) Int. Cl.
- *G06Q 50/40* (2024.01)
- *G07C 5/00* (2006.01)
- *G07C 5/08* (2006.01)
- *H04W 4/029* (2018.01)
- *H04W 4/35* (2018.01)
- *H04W 4/38* (2018.01)
- *H04W 4/40* (2018.01)

(52) U.S. Cl.
CPC ........... *G07C 5/008* (2013.01); *G07C 5/0808* (2013.01); *H04W 4/029* (2018.02); *H04W 4/35* (2018.02); *H04W 4/38* (2018.02); *H04W 4/40* (2018.02)

(58) Field of Classification Search
CPC ........... G06Q 10/0833; G06Q 30/0635; G06Q 50/30; G07C 5/008; G07C 5/0808
See application file for complete search history.

(56) References Cited

U.S. PATENT DOCUMENTS

| | | | | |
|---|---|---|---|---|
| 2004/0243664 | A1* | 12/2004 | Horstemeyer | G08G 1/20 709/200 |
| 2005/0182538 | A1* | 8/2005 | Phelan | G07C 5/0858 701/33.4 |
| 2006/0235739 | A1* | 10/2006 | Levis | G06Q 10/08 705/1.1 |
| 2012/0253892 | A1* | 10/2012 | Davidson | G06Q 10/0631 705/7.42 |
| 2013/0002481 | A1* | 1/2013 | Solomon | B60R 25/33 342/357.54 |
| 2013/0304349 | A1* | 11/2013 | Davidson | G08G 1/202 701/99 |
| 2014/0046701 | A1* | 2/2014 | Steinberg | B60W 40/10 705/4 |
| 2015/0161697 | A1* | 6/2015 | Jones | G06Q 10/1095 705/26.4 |
| 2016/0260059 | A1 | 9/2016 | Benjamin et al. | |
| 2019/0082099 | A1* | 3/2019 | Imomoto | H04N 23/61 |
| 2020/0160268 | A1* | 5/2020 | Han | G06N 3/084 |
| 2020/0348408 | A1 | 11/2020 | Peng et al. | |
| 2022/0122744 | A1 | 4/2022 | Zhang et al. | |

OTHER PUBLICATIONS

Zeeman et al., "Combining speed and acceleration to detect reckless driving in the informal public transport industry", Proceedings of the 16th International IEEE Annual Conference on Intelligent Transportation Systems (ITSC 2013), Oct. 2013, pp. 756-761.

USPTO Office Action issued Jan. 4, 2023 regarding U.S. Appl. No. 17/559,937, 23 pages.

\* cited by examiner

Past Trips

Restaurant ID: 744107

Date: Today Duration: All Driver(s): All Long Stop: All Speeding: All Fast Acceleration: All Hard Brake: All Hard Turn(R): All Hard Turn(L): All Score: All Orders Per Trip: All

[Filter] [Reset]

Search:

| Ticket | Date | Start | End | Duration | Driver | Long Stops | Speeding | Fast Acceleration | Hard Broke | Hard Turn (R) | Hard Turn (L) | Score |
|---|---|---|---|---|---|---|---|---|---|---|---|---|
| 6 | 2020-08-31 | 11:38 | 11:48 | 10 | Mz | - | - | - | - | - | - | 100 |
| 8 | 2020-08-31 | 11:59 | 12:10 | 11 | Mz | - | 3 | 1 | - | - | - | 88 |
| 10 | 2020-08-31 | 12:10 | 12:25 | 15 | Mz | - | 1 | - | - | - | - | 99 |
| 11 | 2020-08-31 | 12:25 | 12:41 | 16 | Mz | - | - | 1 | - | - | - | 98 |
| 12 | 2020-08-31 | 12:52 | 13:13 | 21 | Mz | - | 4 | 4 | - | - | - | 82 |
| 22 | 2020-08-31 | 14:54 | 15:09 | 15 | Mz | - | - | - | - | - | - | 100 |
| 24 | 2020-08-31 | 15:30 | 15:42 | 11 | Mz | - | - | - | - | - | - | 100 |
| 27 | 2020-08-31 | 15:42 | 15:59 | 17 | Mz | - | 2 | - | - | - | - | 97 |
| 35 | 2020-08-31 | 11:16 | 11:38 | 22 | Mz | - | 1 | 1 | - | - | - | 97 |
| 17,18 | 2020-08-31 | 14:05 | 14:27 | 23 | Mz | - | - | 1 | - | - | - | 98 |
| Ticket | Date | Start | End | Duration | Driver | Long Stops | Speeding | Fast Acceleration | Hard Broke | Hard Turn (R) | Hard Turn (L) | Score |

Showing 1 To 10 Of 12 Entries

[Previous] 1 2 [Next]

FIG. 10

METHODS AND SYSTEMS FOR DETECTING DELIVERY TRIP EVENTS AND IMPROVING DELIVERY DRIVER SAFETY

RELATED APPLICATIONS AND/OR CLAIM FOR PRIORITY

This application claims priority under 35 U.S.C 119 to U.S. Provisional Application Ser. No. 63/133,197 filed on Dec. 31, 2020, which is incorporated herein by reference in its entirety.

TECHNICAL FIELD

Embodiments of the present disclosure relate to systems and methods of monitoring and detecting delivery driving events and generating a driving score, and more particularly, for use in monitoring a vehicle during delivery of a product (e.g., food, package, etc.).

BACKGROUND

In delivery applications, business owners want to ensure their businesses are properly represented by their delivery drivers. Additionally, business owners want to ensure that their delivery drivers act safely and according to the laws and rules of the road when operating motor vehicles to make deliveries for the business.

Business owners are often unaware of whether their delivery drivers drive in a safe manner after the delivery driver leaves the store. Accordingly, business owners do not know if their delivery drivers are representing the business in a positive way or if the drivers are being safe among other motorists and pedestrians in the community. Additionally, business owners may have to pay higher insurance costs for their delivery drivers since they cannot provide proof to insurance companies that their drivers act safely and according to the rules of the road while making deliveries.

The methods and systems described herein enable real-time tracking and monitoring of a delivery driver/vehicle during the delivery. In addition, tracking and movement information is transmitted and stored at a remote server during the delivery event, which is stored and associated with a particular customer order. Data about each delivery trip is stored and can be utilized to assess the driver's performance for safety purposes. Specific events occurring during the delivery trip can be detected and used to assess performance. Performance assessment results may then be used to determine whether additional driver safety training should be employed. Such monitoring, tracking and assessment methods and processes herein may help reduce insurance costs for business making deliveries—if these are robust, accurate and objectively based.

SUMMARY

In accordance with one embodiment of the present disclosure, there is provided a method for monitoring and detecting unsafe driving events occurring during a delivery trip event for delivery of a product from a home store location to a delivery address. The method includes detecting, by a wireless communication device, a start of a delivery trip event and activating a tracking and safety data collection and transmission process within the wireless communication device. Activating of the process includes activating one or more sensors and generating sensor data, including generating sensor position data for the communication device periodically at a predetermined rate and generating sensor acceleration data. The method further includes storing the generated sensor position data as delivery trip event data, processing at least some of the generated sensor data and detecting a driving event occurring during the delivery trip event, and when a driving event is detected, storing detected driving event information as delivery trip event data, wherein the detected driving event information comprises an identifier of the detected driving event and data indicative of a position the driving event occurred. Delivery trip event data is accumulated over a predetermined time period and transmitted from the wireless communication device to a remote server device. The end of the delivery trip event is detected and the tracking and safety data collection and transmission process is deactivated within the wireless communication device.

In accordance with another embodiment, there is provided a communication device for monitoring and detecting driving events occurring during a delivery trip event for delivery of a product from a home store location to a delivery address. The communication device includes memory configured to store data and one or more sensors configured to generate sensor data, the sensor data comprising sensor position data indicative of location of the communication device and sensor acceleration data indicative of acceleration of the communication device The device includes a processor configured to (a) detect a start of a delivery trip event, (b) activate a tracking and safety data collection and transmission process within the wireless communication device, (c) activate the one or more sensors to generate the sensor position data periodically at a predetermined rate and to generate the sensor acceleration data, (d) store in the memory the generated sensor position data as delivery trip event data, (e) process at least some of the generated sensor data and detect a driving event occurring during the delivery trip event, (f) when a driving event is detected, store detected driving event information as delivery trip event data, wherein the detected driving event information comprises an identifier of the detected driving event and data indicative of a position the driving event occurred, and (g) accumulate delivery trip event data over a predetermined time period and store in the memory. A wireless transceiver is configured to transmit, from the wireless communication device, the accumulated delivery trip event data to a remote server device, and the processor is further configured to detect an end of the delivery trip event and deactivate the tracking and safety data collection and transmission process within the wireless communication device.

BRIEF DESCRIPTION OF THE DRAWINGS

FIG. 10 is an example display or screenshot with delivery trip data listing multiple delivery trips performed by one driver.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged systems or devices.

Figure 1:
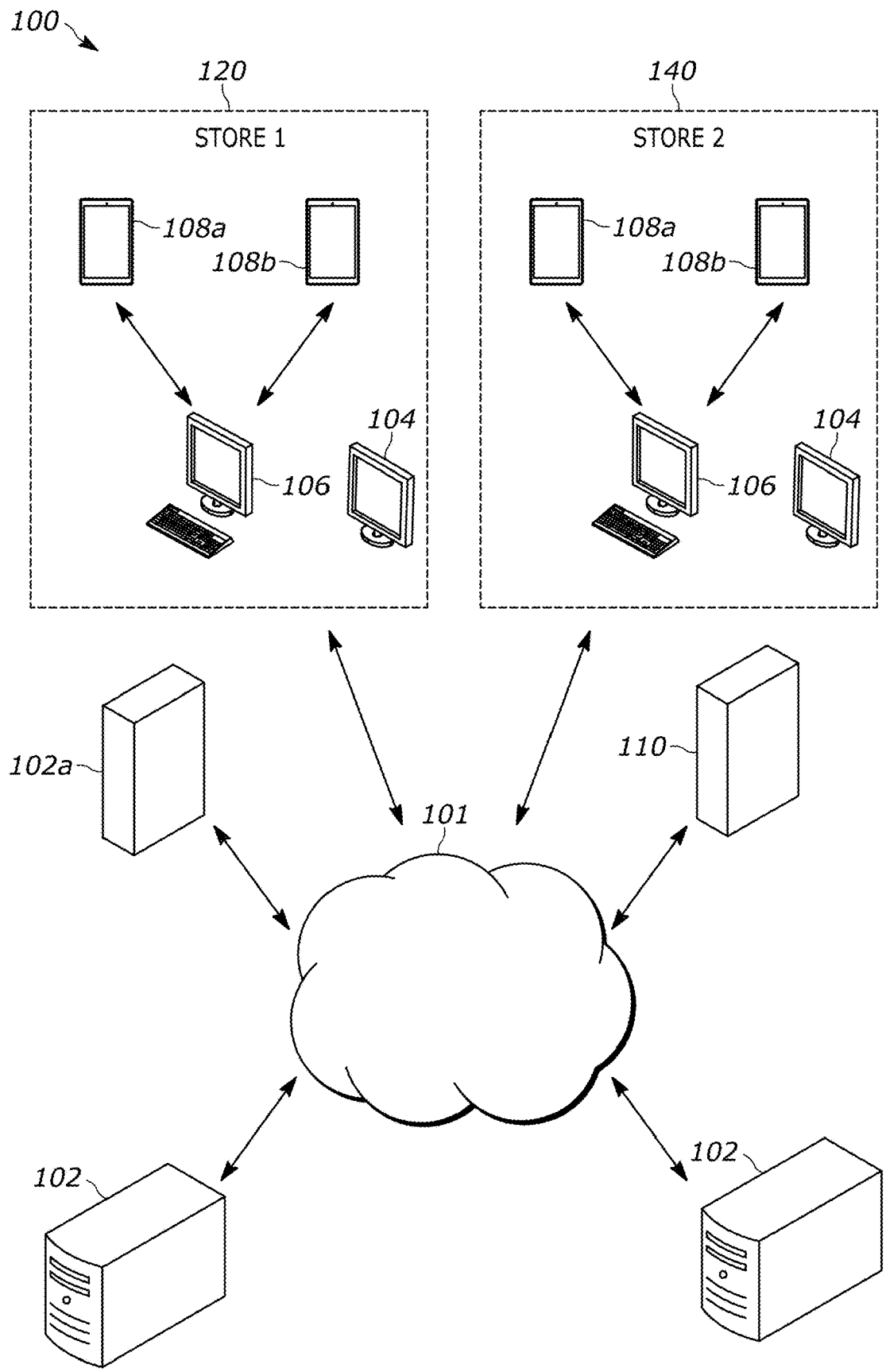
FIG. 1 illustrates an example network system in which various embodiments of the present disclosure may be implemented.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a communications network 101, which facilitates and implements communication between various components in the system 100. For example, the network 101 may communicate Internet Protocol (IP) packets or other information between various devices, as shown. The network 101 may include one or more local area networks (LANs); metropolitan area networks (MANs); wide area networks (WANs); a virtual private network (VPN); all or a portion of a global network, such as the Internet; or any other communication system or systems at one or more locations, and may include wireless and/or wireline communications, or combination thereof.

The network 101 enables communications among multiple electronic devices/systems, including mobile devices, store portal and point-of-sale (POS) systems, ecommerce servers or platforms, enterprise systems, cloud-based server(s) and/or other third-party servers and systems. In the embodiment shown, a first group of electronic devices 104, 106, 108a, 108b are associated with a Store 1 (e.g., restaurant, warehouse, etc.) having a related predetermined geographical delivery area 120, while a second group of similar electronic devices 104, 106, 108a, 108b are associated with a Store 2 (e.g., restaurant, warehouse, etc.) having a related predetermined geographical delivery area 140. As will be appreciated, the delivery location/areas 120 and 140 may be separate, may overlap and/or may have different sizes. Although only two stores with their respective delivery areas are shown in FIG. 1, any number of stores (each associated with a group of devices) and their assigned delivery areas may be included. Other embodiments are contemplated, such as fewer or additional electronic devices 108 within a given store or area.

The system 100 further includes one or more remote servers or data processing systems 102 (hereinafter referred to as enterprise servers 102). Although only two are shown, there may be additional or fewer enterprise servers 102 coupled to the network 101. Each enterprise server 102 is configured to provide various functions, including receiving and processing orders from customers over the network 101, such as orders originating from a customer's mobile device or other network device (e.g., via wired and/or wireless), and communicating data with other network connected devices, such as electronic devices 104, 106, 108. For example, if the store is a restaurant specializing in pizza, a customer may place an order for pizza delivery via an application running on the customer's mobile phone or desktop computer which interfaces/communicates with an ecommerce platform/server 102a which, in turn, transmits order (and payment) information to the enterprise server 102 to generate and store a customer order/information record, and for further processing.

As will be appreciated, the one or more enterprise servers 102 may include the functionality of the ecommerce platform/server 102a therein and/or additional separate ecommerce servers 102a may be included in the system 100. The embodiment shown in FIG. 1 includes at least one ecommerce server 102a providing an ecommerce platform/server functionality and depicted separately from the enterprise servers 102. References and embodiments discussing the ecommerce server 102a are equally applicable to the enterprise servers 102 (in the event the enterprise servers/systems include ecommerce platform/server functionality integrated therein).

Each electronic device 104 (depicted as a display device) is typically disposed at or within a specific store (e.g., Store 1, Store 2, Store N) and may be referred to as a store portal system or device 104. Store portal systems 104 are configured to receive data via network 101 from various sources (e.g., the enterprise server 102, and possibly the ecommerce server 102a) and display various types of information, including customer order data, graphical images such as a map, delivery driver information, and real-time delivery data. In one embodiment, each store portal system 104 displays a street-level map of the geographical delivery area associated with a given store and the real-time location of each delivery driver/vehicle on the map. The store portal system 104 may also be implemented by a server-type or desktop computer system and configured to store customer order/information and delivery event/trip information.

Each electronic device 106 (depicted as a POS system) is also typically disposed at or within a specific store (e.g., Store 1, Store 2, Store N) and may be referred to as a store POS system or device 106. The store POS system 106 is configured to provide various functions, including input and processing for store employee and delivery driver login/registration and logistics, receiving customer order information (e.g., in person and via telephone) to generate and store a customer order/information record, payment processing, and displaying graphical or other information. The store POS system 106 is also configured to transmit/receive data (e.g., customer order data and delivery dispatch data) via the network 101 to/from other devices, including the enterprise server 102 (and possibly the ecommerce server 102a), and the electronic devices 108. As will be appreciated, although the store portal system 104 and the store POS system 106 are shown as separate systems, their functionality could be combined into a single systems or group of interconnected devices. Further, one or more servers (e.g., 102, 102a) coupled with the system 106 and/or system 104 may be designated as a sub-system of the overall system and interconnected devices on the network.

The electronic devices 108a, 108b (depicted in FIG. 1 as mobile phones) are each typically associated with a person or vehicle (e.g., a delivery driver/person or delivery vehicle) and further associated with a given store and assigned delivery area (hereinafter referred to as a driver/vehicle device 108). Each driver/vehicle device 108 is configured to provide various functions, including wireless communications capabilities (including data and voice), sensing and collecting data representative of one or more physical phenomena or attribute (e.g., location, position, acceleration, orientation, velocity, etc.) being experienced by, applicable to, or otherwise occurring at the driver/vehicle device 108. This data may be referred to as "tracking and driving" data, storing and processing collected data, and transmitting raw and/or processed data via network 101 to one or more remote servers or processing systems (e.g., the enterprise server 102). Each driver/vehicle device 108 may also be configured to communicate (wirelessly or via wireline) with the store portal system 104 and the store POS system 106.

The enterprise server 102 may be any suitable electronic computing or processing device(s) configured to provide computing services, including software and cloud computing for one or more of the devices 102a, 104, 106, 108a, 108b (individually and/or on a group basis). The enterprise server 102 includes, for example, one or more processing devices, one or more memories storing instructions and data, various applications and software, and one or more network interfaces configured to facilitate and enable communication over the network 101 to other devices. In one particular embodiment, the enterprise server 102 may include a data server configured to receive, store, process and analyze data received from various remote sources (e.g., the devices 102a, 104, 106, 108a, 108b) and transmit data to those same or other remote sources, as will be further discussed in greater detail below. The enterprise server 102 may include an application server configured to provide web applications, ecommerce applications, desktop applications, client applications, and/or mobile applications for processing data and transmitting data to remote sources, as will be further discussed in greater detail below.

Similarly, the ecommerce server 102a (when separate from the enterprise platform/server 102) may be any suitable electronic computing or processing device(s) configured to provide computing services, including ecommerce server functionality, data processing, and communications with one or more of the devices 104, 106, 108a, 108b (individually and/or on a group basis), the enterprise servers 102, and other devices coupled to the network 101. The ecommerce server 102a includes, for example, one or more processing devices, one or more memories storing instructions and data, various applications and software, and one or more network interfaces configured to facilitate and enable communication over the network 101 to other devices and systems.

The ecommerce servers 102a (separate or when integrated into an enterprise platform/server 102) are configured to typically provide user interface and web application capabilities for performing online commerce with customers. For example, online menu and ordering capabilities are provided to various user devices via the network 101 enabling a customer to engage in electronic commerce—such as ordering a pizza for delivery/pickup from a store located near the customer (e.g., viewing, ordering, communications, payment, etc.).

More than one enterprise server 102 may be provided in other embodiments, and the functionality of the enterprise server 102 may be implemented as a single server entity (depending on the desired application and computing requirements) or may be implemented by a group of devices or servers, such as a data server, a processing and computing server, an operations and management server, etc. In addition, the enterprise server 102 may be one or more physical servers hosted by an entity or virtual servers as part of a cloud computing environment. These same or similar alternatives and configurations may be applied to the ecommerce server 102a as well.

The driver/vehicle devices 108a, 108b represent any suitable mobile electronic computing or processing device configured to communicate wirelessly via the network 101 various devices coupled thereto, including with at least one enterprise server 102 or other network-coupled device(s) (e.g., the POS device 106 or the portal 104) via the network 101. In addition, the driver/vehicle devices 108a, 108b are further configured to communicate over other channels or networks (wired or wireless, such as BlueTooth, WiFi, NFC, optical, etc.) for communications between the driver/vehicle devices 108a, 108b and other devices, such as to the store POS system 106 and the store portal device 104. In one embodiment, the store POS system 106 and the driver/vehicle device 108 each include near field communication (NFC) interfaces for implementing wireless communications therebetween, such as for login/registration with the store/system and dispatch of delivery orders from the store POS system 106 to a delivery/vehicle device 108a, 108b.

Examples of suitable driver/vehicle devices 108a, 108b may include various types of mobile communication devices (e.g., mobile phone, smartphone, tablet, PDA, and the like). As will be appreciated, other suitable types and configurations of driver/vehicle devices 108a, 108b could be used in the networked system 100.

As will be understood, the driver/vehicle devices 108a, 108b and at least the store portal device 104 are configured to receive data or images from the enterprise server 102 for display to one or more store employee(s) (e.g., manager, delivery driver), as further discussed in greater detail below.

Although FIG. 1 illustrates one example of the networked system 100, various changes may be made to FIG. 1. For example, the system 100 could include any number of each component in any suitable arrangement of the enterprise server 102, the ecommerce server 102a, the store portal device 104, the store POS system 106 and the driver/vehicle devices 108a, 108b. Also, the enterprise servers 102, the ecommerce server 102a, and other servers/devices coupled to the network 101 (e.g., a server/application 110) may be representative of any number of servers and/or electronic devices that form part of system 100. In general, computing and communication systems come in a wide variety of configurations, and FIG. 1 does not limit the scope of this disclosure to any particular configuration or embodiment. While FIG. 1 illustrates one operational environment in which various features disclosed in this patent document can be used, these features could be used in any other suitable system.

Figure 2:
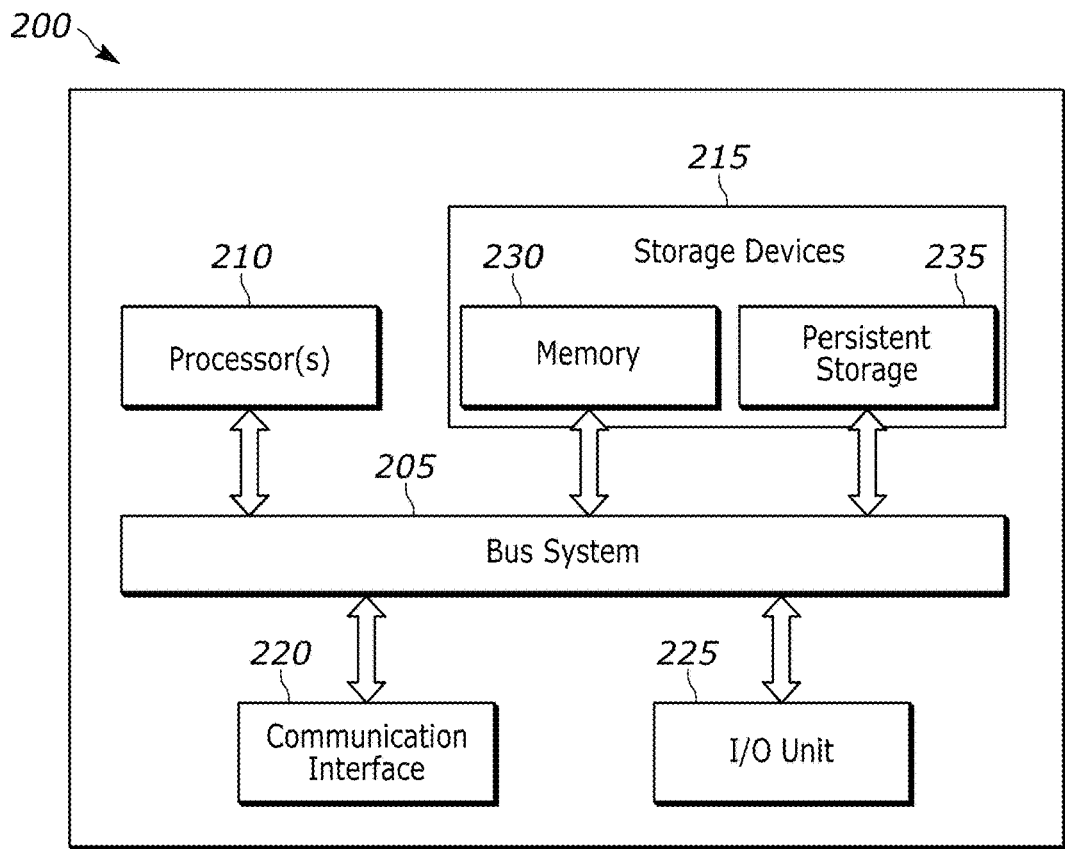
FIG. 2 illustrates an example server/network device in the networked system according to various embodiments of the present disclosure.
Figure 3:
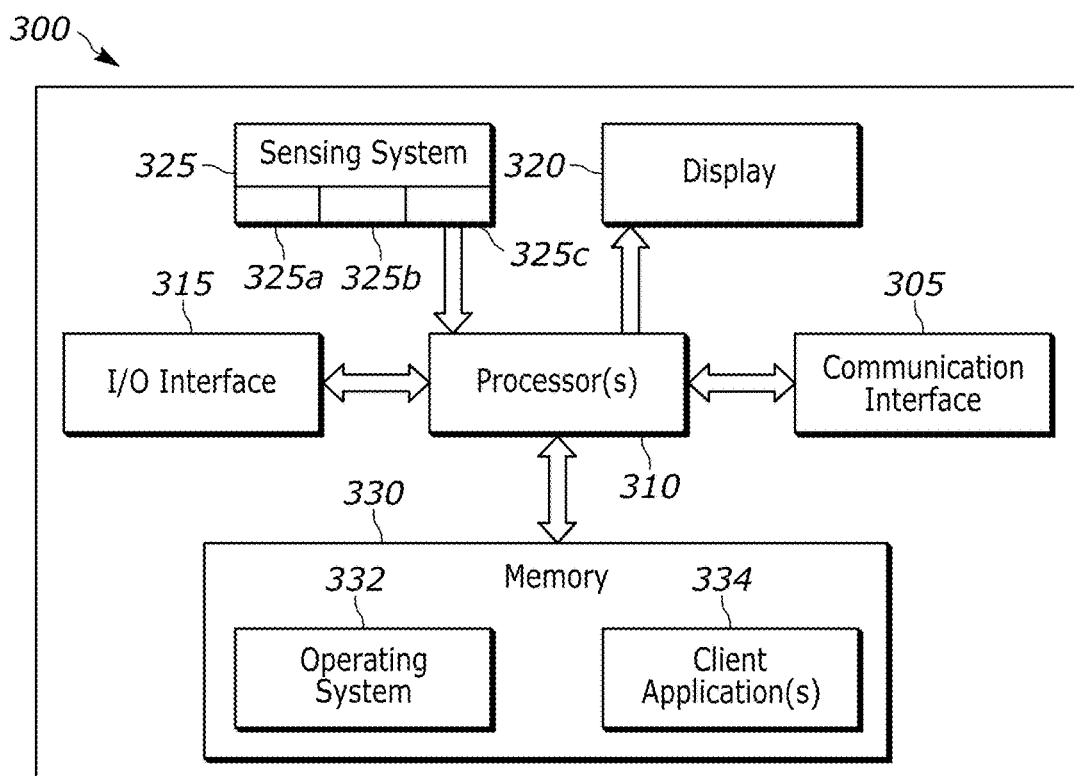
FIG. 3 illustrates an example of a mobile electronic device (associated with a delivery vehicle or driver) for use in the networked system according to various embodiments of the present disclosure.
Figure 4A:
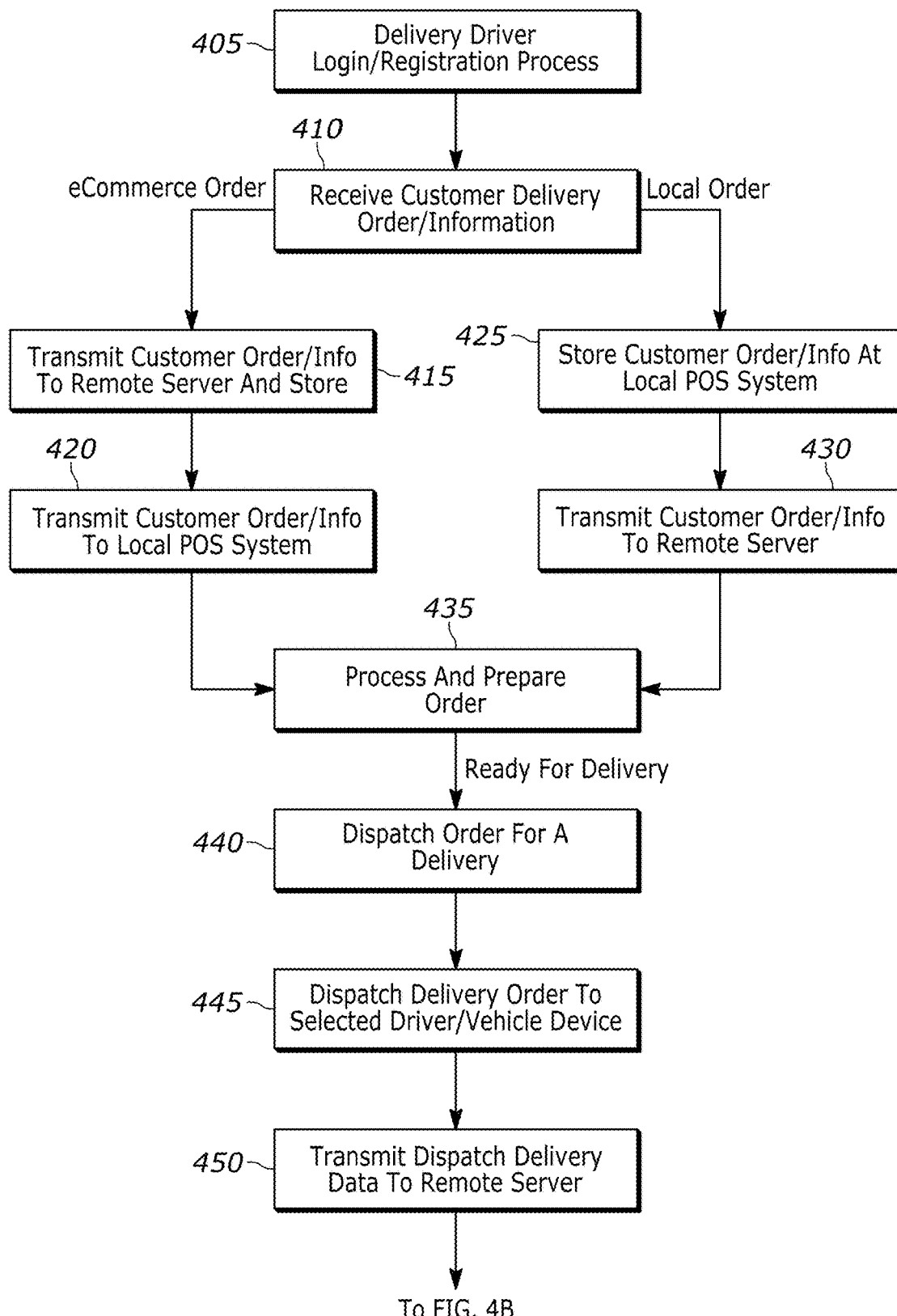
FIGS. 4A and 4B illustrate an example method or process for use in tracking and monitoring movement of the mobile electronic device (associated with a delivery vehicle or driver) during delivery of a product to a delivery destination address in accordance with various embodiments of the present disclosure.
Figure 4B:
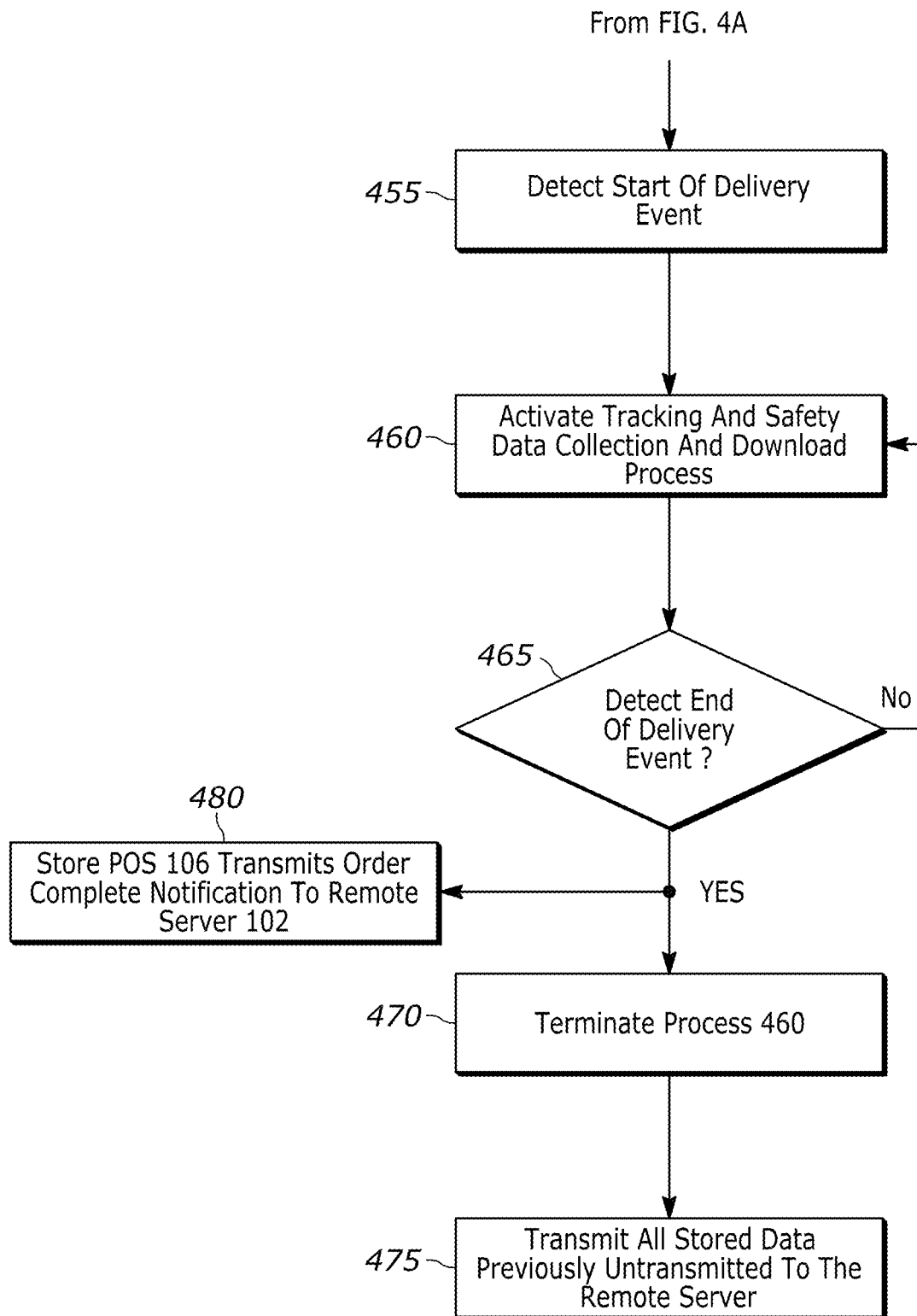

FIGS. 2 and 3 illustrate example network devices in the networked system 100 according to various embodiments of the present disclosure. FIG. 2 illustrates example functional blocks/components within an example device 200 which may represent the enterprise server 102, the ecommerce server 102a, the store POS system 106 and/or the store portal device 104—although additional or fewer components may be included in each respective system or device. FIG. 3 illustrates example functional blocks/components within an example device 200 which may represent the driver/vehicle devices 108, as shown in FIG. 1. The embodiment of the example device 200 shown in FIG. 2 and the example device 300 shown in FIG. 3 are for illustration purposes only, and other configurations and embodiments of the device 200 (e.g., representative of the devices 102, 102a, 104, 106) and the device 300 (e.g., representative of the devices 108) may be used without departing from the scope of this disclosure.

Turning now to FIG. 2, an example enterprise server 102/ecommerce server 102a (implemented by device 200) includes a bus system 205, which supports communication between processor(s) 210, one or more storage devices 215, a communication interface (or circuit) 220, and an input/output (I/O) unit 225. The processor(s) 210 execute(s) instructions that may be loaded into a memory 230. The processor(s) 210 may include any suitable number(s) and type(s) of processors or other devices in any suitable arrangement. Examples of the processor(s) 210 include microprocessors, microcontrollers, digital signal processors, field programmable gate arrays, application specific integrated circuits, and discrete processing circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage memory or device(s). The persistent storage 235 may contain one or more components or devices supporting longer-term storage of data, such as a read-only memory, hard drive, flash memory, or optical disc. For example, persistent storage 235 may store one or more databases of data, standards data, results, data, client applications, etc.

The communication interface 220 supports communications with other systems or devices via network 101 (and possibly other network(s) and communications channels, not shown). For example, the communication interface 220 could include a network interface card or a wireless transceiver configured to provide communications over the network 101. The communication interface 220 may support communications through any suitable physical or wireless communication link(s). The I/O unit 225 allows for input and output of data. For example, the I/O unit 225 may provide a connection for user input through a keyboard, mouse, keypad, touchscreen, or other suitable input devices. The I/O unit 225 may also send output to a display, printer, or other suitable output devices.

Although FIG. 2 illustrates one example of an enterprise server 102 (or ecommerce server 102a), various changes may be made to FIG. 2. For example, various components in FIG. 2 could be combined, further subdivided, or omitted and additional components could be added according to particular needs, such as when the device 200 is implemented as the store POS system 106 or the store portal system 104. As a particular example, while depicted as one system, the enterprise server 102 and/or ecommerce server 102a may include multiple servers or systems that may be remotely located. In another example, different server systems may provide some or all of the processing, storage, and/or communication resources for performing one or more of the methods, processes, or functions described herein, and including delivery tracking, safety and training functions in accordance with various embodiments of the present disclosure. As will be appreciated, the store POS system 106 and the store portal system 104 are typically disposed at a fixed establishment/location, such as at the store.

Now turning to FIG. 3, there is illustrated one embodiment of an example driver/vehicle device 108 (implemented by device 300) that includes a communication interface (or circuit) 305, a processor(s) 310, an input/output (I/O) unit 315, a data collection and sensor system 325, a display 320, and a memory 330. The memory 330 includes an operating system (OS) 332 and one or more client applications 334.

The communication interface or circuit 305 supports communications with other systems or devices via the network 101 (and possibly via other network(s) and communications channels, not shown), such as via network 101 or via other communications channels. For example, the communication interface 305 could include a network interface card or a wireless transceiver configured to provide communications over the network 101. The communication interface 305 may support communications through any suitable physical or wireless communication link(s). For embodiments utilizing wireless communication, the communication interface 305 is configured to receive incoming RF signals and data via one or more antennas using a variety of wireless communication networks and/or protocols, (e.g., Bluetooth, Wi-Fi, cellular, 4G, LTE, 5G communication protocols, etc.) and may further transmit RF signals and data. In one embodiment, the driver/vehicle devices 108a. 108b and the store POS system 106 may each include a near field communication (NRC) transceiver and interface for providing communications therebetween.

The processor(s) 310 may include one or more processors or other processing devices and execute the OS 332 stored in the memory 330 to control the overall operation of the electronic device 300. The processor(s) 310 is also capable of executing client application(s) 334 resident in the memory 330, such as, program code for one or more client applications. The processor(s) 310 can move data into or out of the memory 330 as required by an executing process.

The processor(s) 310 is also coupled to the I/O unit 315 which provides the driver/vehicle device 108 with input/output capabilities, including communicating and connecting to other devices, such as nearby laptop computers, handheld computers and other accessories. The I/O unit 315 provides the operator of the electronic device 300 the capability for user input to the electronic device 300. For example, the I/O unit 315 may include a keyboard, mouse, keypad, stylus, touchscreen, electronic pen, or other suitable input device (or include an electrical interface for connection to such external device(s)). The I/O unit 315 may also send information to the display 320, or another external display, printer, or other suitable output device.

The processor(s) 310 is further coupled to the display 320. The display 320 may be a liquid crystal display, light emitting diode display, touchscreen, or other display capable of rendering text and/or at least limited graphics, such as from websites. The memory 330 is coupled to the processor(s) 310. Portions of the memory 330 could include random access memory (RAM) and/or a Flash memory and/or read-only memory (ROM). Although not shown, the driver/vehicle device 108 will typically include a bus system that interconnects the components therein.

The processor(s) 310 is further electrically coupled to the data collection and sensor system 325 having various components and functionality for sensing events, occurrences and/or other data. For example, the sensor system 325 is shown including a location/position sensing/determining device 325*a*, an accelerometer 325*b*, and a gyroscope 325*c*, and may include other sensors (not shown), for sensing physical phenomena or attributes (e.g., location/position, velocity, acceleration, orientation, etc.) applied to or otherwise affecting the driver/vehicle device 108. As will be appreciated, in operation, the driver/vehicle device 108 accompanies the delivery driver (or is otherwise disposed within the delivery vehicle) and, as a result, the delivery driver's actions operating the vehicle will, in most cases, generate the physical phenomena applied to or exerted on the driver/vehicle device 108. In other words, the driver/vehicle device 108 senses and detects movements of the delivery vehicle (by virtue of the device 108 being disposed within the delivery vehicle).

Although FIG. 3 illustrates one example of the driver/vehicle device 108, various changes may be made to FIG. 3. For example, various components in FIG. 3 could be combined, further subdivided, or omitted and additional components could be added according to particular functional needs. In one embodiment, the device 300 operating as the driver/vehicle device 108 is implemented as a mobile device having the general capabilities and functionality of a presently available mobile phone or smartphone—such as mobile phones currently available from several manufacturers, including Apple, Samsung, etc. Additional processes, methods, software and/or applications are included which provide the functionality in accordance with the teachings described herein. In another embodiment, the driver/vehicle device 108 may be a custom device or a stripped-down version of a commercially available mobile phone limited to the necessary functionality described herein. As will be appreciated, one specific embodiment of the delivery/vehicle device 108 shown in FIG. 1 corresponds basically to the device 300 as illustrated in FIG. 3. For purposes of illustration and explanation, these devices will hereinafter be referred to as driver/vehicle devices 108.

It will be understood that, in one preferred embodiment, each driver/vehicle device 108 is a stand-alone or autonomous device and configured to operate as described herein without any wired or other connections to any other device or component within the vehicle (e.g., separate GPS receiver, in-vehicle sensors, OBD data/devices, etc.). Although a power source (e.g., rechargeable battery) is disposed within the device 108 to provide necessary power for operation, in one embodiment, the device 108 may be connected to a readily-accessible power source available with the vehicle (e.g., USB interface port, cigarette lighter, A/C plug,) if desired. However, such power connection does not make the devices 108 any less stand-alone or autonomous as described above (e.g., no separate sensing or data collection devices disposed outside the device 108).

FIG. 4 illustrates an overall process or method 400 in accordance with aspects of the present disclosure. The method 400 depicts an example order and delivery process including various events over time, including such events as delivery driver logon/registration, customer order reception, order processing, dispatch of order for delivery, tracking and monitoring the driver/vehicle device 108 and transmission of associated data during the delivery event to the remote enterprise server 102, delivery trip termination, remote delivery data processing and trip data generation during and after the delivery event, transmission of generated trip data to a local store after the delivery event, and display review and training. It will be understood the driver/vehicle devices 108 are carried by each driver or otherwise disposed within or affixed to a respective delivery vehicle (not shown in the Figures) during a dispatched delivery.

The method 400 begins with a delivery driver login and registration process or procedure (step 405). In this procedure, a delivery driver may login and register herself and her respective driver/vehicle device 108*a* with a home store (e.g., Store 1). For example, the driver may login and register using the store POS system 106, using the driver's associated driver/vehicle device 108*a*, or using some combination thereof. As will be appreciated, the operation of the methods herein occurs as a result of a software application loaded onto the device 108 and launching of the application which provides the noted functionality for the device 108.

In one embodiment, the driver logs into his/her applicable store POS system 106 and registers using an identification number or username (ID), such as an employee number or other assigned identification. This may be implemented via a card swipe, manual input, or some other suitable means. In addition, at this time, an ID number (e.g., MAC address) of the associated driver/vehicle device 108*a* may also be entered into the store POS system 106 (or may have been previously stored and associated with the delivery driver ID). In either case, the store POS system 106 links or associates the delivery driver ID with the ID corresponding to the associated driver/vehicle device 108*a*. This delivery driver login and association information (e.g., driver ID and associated device ID) is then transmitted to the enterprise server 102 servicing that store (e.g., Store 1) and stored at the server 102.

As one alternative embodiment, the delivery driver may launch a mobile application 334 resident within his/her associated driver/vehicle device 108*a* to initiate a similar login or registration process. The driver may likewise use the driver's ID or username. The mobile application 334 establishes a connection with a counterpart application executing at the enterprise server 102 and transmits login information to the enterprise server 102, including the driver ID/username and the ID corresponding to the driver/vehicle device 108*a* (which could be obtained automatically during execution of the application 334).

In yet another embodiment, the login/registration process may be implemented by the delivery driver interacting with the application 334 which, in turn, establishes a connection with a counterpart application executing at the store POS system 106. The POS system 106 may then transmit the delivery driver login and association information (e.g., driver ID and associated device ID) to the enterprise server 102 and stored.

With this information, the enterprise server 102 stores a correspondence or link between the delivery driver ID and his associated driver/vehicle device 108*a*. Thus, the driver and the device 108*a* are registered within the system and associated together. Different or other login/registration processes may be utilized provided the enterprise server 102 obtains and stores a relationship between a specific delivery driver and a specific delivery/vehicle device 108. Once the login/registration process (step 405) is complete, the delivery driver and his associated deliver/vehicle device 108*a* are available to make deliveries.

Communications between the store POS system 106 and the delivery/vehicle device 108*a* may be implemented via the network 101 or some other communication channel or network (wired or wireless, such as BlueTooth, WiFi, optical, etc.). In one example embodiment, the POS device 106 communicates with the delivery/vehicle device 108*a* using near field communication (NFC) and NFC interfaces within each device.

At some point, a customer delivery order is received (step 410). Customer orders are typically received in one of two main ways: in-store or electronic commerce.

By way of example, a customer may place an order directly with the home store via telephone (or in-person) for delivery to a remote location (delivery destination). In the scenario, a store employee would receive or otherwise obtain the relevant customer order and information and generate and store a customer order/information (e.g., order number, timestamp, name, delivery address, delivery time, contact information, order specifics, stored id, etc.) within the local store POS system 106 (step 425), which may include an order number and/or a timestamp indicating the date/time the order was received/placed. This customer order/information (e.g., order number, timestamp, name, delivery address, delivery time, contact information, order specifics, etc.) is then transmitted to the enterprise server 102 and stored (step 430). The stored customer order/information may then be used in subsequent processing in conjunction and correlation with tracking and safety data collected by the driver/vehicle device 108a during delivery.

In another example, a customer may place her order via a web or other network application executing within the ecommerce platform/server 102a (e.g., online order processing server) which can be implemented as a standalone online processing system or integrated with the enterprise server 102 and coupled to the network 101. In general terms, a customer will select a home store and place an order for delivery from the selected store. The ecommerce server 102a receives or otherwise obtains the relevant customer order and information and generates and stores a customer order/information (e.g., order number, timestamp, name, delivery address, delivery time, contact information, order specifics, store id, etc.), and then transmits customer/order information to the enterprise server 102 (step 415) which is stored. Such information may include an order number and/or a timestamp indicating the date/time the order was received/placed. This stored customer order/information may then be used in subsequent processing at the server 102 in conjunction and correlation with tracking and safety data collected by the driver/vehicle device 108a during delivery. The ecommerce server 102a also transmits the customer order/information (e.g., order number, timestamp, name, delivery address, delivery time, contact information, order specifics, store id, etc.) to the applicable store POS system 106 of the selected store (step 420). Alternatively, customer order/information may be transmitted by the enterprise server 102 to the applicable POS system 106 (not shown in FIG. 4A). In yet another embodiment, the customer order/information may be transmitted by the ecommerce server 102a to the POS system 106 which then may transmit customer/order information to the enterprise server 102.

As will be appreciated, all or only some of the customer/order information received (and generated) by the ecommerce server 102a may be transmitted to the enterprise server 102 and/or the POS system 106, depending on a particular application or implementation. In other embodiments and/or for other applications (e.g., delivery of items other than food from a restaurant), different or additional customer order/information may be collected and generated during order receipt and processing—dependent on the desired application.

In some embodiments, the server 102 and/or the store POS system 106 may also deliver some or all of the customer order data to the store portal device 104 for display on one or more display screens (e.g., displaying pending current orders).

After a customer order is placed within the store POS system 106 (either by a store employee directly from customer input or indirectly via the ecommerce server 102a), store employee(s) proceed with processing and fulfilling the order (step 435). After fulfillment (which in the case of a restaurant, may include quality checks and inspection of prepared food), the customer order is deemed ready for delivery.

Next, the order is dispatched to a driver or driver/vehicle device 108a for delivery (step 440). Dispatching the order for delivery may include several sub-steps, including assigning/selecting a delivery driver or driver/vehicle device 108a, associating the customer order/information with the selected delivery driver (driver ID) or driver/vehicle device 108a (device ID), and optionally transmitting this association information to the enterprise server 102 for enabling the enterprise server 102 to associate the assigned/selected delivery driver or driver//device 108a with the customer order/information stored at the server 102.

Assigning/selecting a delivery driver or driver/vehicle device 108a may be implemented by a person, such as a store employee, manager, or delivery driver, assigning the customer order for delivery to a selected driver via input to the store POS system 106 and/or input to the driver/vehicle device 108a. This may be performed using an application executing within the store POS system 106 and/or a related client application (e.g., 334) executing within the driver/vehicle device 108a. As will be appreciated, the client software application (e.g., 334) is installed on the device 108 and launched to provide the functionality noted herein for the device 108. Typically, the client application 334 within the device 108 may launched/opened by the delivery driver at the time his/her shift begins and may be ended/closed as the shift ends.

In another embodiment, a delivery driver or driver/vehicle device 108a may be chosen from a displayed list of available delivery drivers in response to user input at the store POS system 106. In another embodiment, the delivery driver may be automatically selected using a predetermined selection process or algorithm performed by the store POS system 106. Once selected, the store POS system 106 assigns or otherwise associates the customer order to the selected delivery driver and/or his associated driver/vehicle device 108a in the system, and may optionally transmit this association information to the enterprise server 102—enabling the enterprise server 102 to associate the assigned/selected delivery driver or driver/vehicle device 108a with the customer order/information stored at the server 102.

As previously described, the driver/vehicle device 108a may be communicatively coupled with the store POS system 106 via the network 101. After the customer order is dispatched for delivery, the store POS system 106 dispatches a delivery order to the selected driver/vehicle device 108a.

In one embodiment, dispatching the delivery order includes transmitting order dispatch data (e.g., in a delivery dispatch message) to the driver/vehicle device 108a associated with the selected delivery driver or vehicle (step 445). The delivery dispatch message may be transmitted from the store POS system 106 to the delivery/vehicle device 108a via the network 101 or via some other communication channel or network (wired or wireless, such as BlueTooth, WiFi, optical, etc.) In one example embodiment, the store POS system 106 communicates the delivery dispatch message to the driver/vehicle device 108a using near field communication (NFC) and NFC interfaces within each device. The order dispatch data can include some or all of the following data/information: order/delivery event ID, delivery address, delivery driver ID, driver/vehicle device ID, and other related order information.

The dispatching step may further include transmitting some or all of the order dispatch data (e.g., in a dispatch message) to the enterprise server 102 via the network 101 (step 450). This may not be performed if the optional transmission of the association information was performed in the step 440 above. As will be appreciated, transmitting the dispatch message to the enterprise server 102 may be performed by either the driver/vehicle device 108 (after receiving the delivery dispatch message) or the store POS system 106, or both. Upon receipt, the enterprise server 102 obtains or otherwise generates an association or correspondence between the assigned delivery/vehicle device 108a (and delivery driver) and the customer order/information stored at the enterprise server 102. As discussed further below, this enables the enterprise server 102 to associate its record of the customer order/information with tracking and safety/driving data generated and received from the assigned delivery/vehicle device 108a during the applicable delivery event.

In an alternative embodiment, since customer order/information has previously been transmitted to the enterprise server 102, if the optional step of transmitting association information to the enterprise server 102 (for enabling the enterprise server 102 to associate the assigned/selected delivery driver or driver device 108a with the customer order/information stored at the server 102) is performed, the enterprise server 102 may dispatch the delivery order to the selected driver/vehicle device 108a by transmitting the order dispatch data (e.g., in a dispatch message) directly to the device 108a.

The client application 334 (executing within the driver/vehicle device 108a) detects the start of a delivery event (step 455) for an associated delivery driver/vehicle 108a. This detection may be triggered in response to receipt of the delivery dispatch message or some other event(s).

In one embodiment, a "delivery event" is defined as the period of time during which the driver/vehicle device 108a is tracked and monitored—typically during delivery of the customer's order. In a specific embodiment, the "delivery event" includes three distinct time periods. A "pre-delivery" period occurs between the time of dispatch of the delivery order to the driver/vehicle device 108a and the time the driver/vehicle device 108a begins the delivery trip. A "post-delivery" period occurs between the time the driver/vehicle device 108a ends the delivery trip and the time the delivery order is "cashed-out" or otherwise terminated. The "delivery" period spans the time between the beginning of the delivery trip and the ending of the delivery trip. Any suitable event(s) can be selected to trigger the beginning and ending of a delivery trip, including movement (or non-movement) events, leaving or returning to the home store location, geofencing events, user input, and the like. In another embodiment, the delivery event may include only the delivery period, or could include other periods of time and defines as desired.

In other embodiments, a delivery event may span the time period from the start of a delivery at a predetermined start location to the end of the delivery at a predetermined end location. In some embodiments, the start and finish locations are the same (e.g., at the store), however other suitable endpoint(s) could be chosen and may be different from each other, as desired. The start of a delivery event may be chosen at any suitable point in time, such as upon dispatch of the delivery order to the driver/vehicle device 108a (e.g., upon recognition or acceptance by the driver/vehicle device 108a), upon manual input to the driver/vehicle device 108a (or store device 106), or upon initial movement of the delivery vehicle from the start location (e.g., based on a motion threshold, such as acceleration or velocity).

Upon detecting the start of the delivery event, the driver/vehicle device 108 activates a tracking and safety data collection and downloading process (step 460) (e.g., a process/routine within application program 334) for sensing, measuring and monitoring various physical phenomena exerted upon (or associated with) the driver/vehicle device 108a during the delivery event. As will be appreciated, the process 460 is illustrated in more detail in FIG. 6.

The process 460 includes activating the sensor devices of the sensing system 325 (step 460a). Once activated, the sensors generate or produce sensor data which provides location, position, acceleration and/or orientation information about the driver/vehicle device 108a (step 460b). The sensor data, including data generated and output from the location sensing/determining device 325a, the accelerometer 325b, and/or the gyroscope (325c), is stored in memory within the device 108a (step 460c). The foregoing sensor data may be referred to as "raw sensor data." As will be understood, each sensor device samples and outputs its sensor data at a given sample rate. Sampling rates may be fixed or programmable, and may be different or the same for each sensor device. In one embodiment, the sampling rate is the same for each sensor, and a batch of data from the sensors is generated and stored at the specified sampling rate (or frequency). This enables control over the rate/frequency at which sensor data is generated and stored, and thus the amount of data generated, stored and subsequently transmitted (to the remote enterprise server 102). This also enables sampling of the sensor data at one specified rate/frequency during a first time period and sampling sensor data at different specified rate/frequency during a second time period, and so forth. This is beneficial when sensor data generation during certain time periods is more or less critical or has different importance (see, discussion below of pre- and post-delivery periods).

In addition, the processor(s) 310 (or sensing system 325 itself) may further process all or part of this sensor data and generate additional refined or processed sensor data providing additional information. The process 460 may include the client application 334 processing stored raw sensor data to determine that one or more driving events are occurring or have occurred during the delivery event (step 460d). Examples of a "driving event" may include speeding events (e.g., exceeding velocity/speed thresholds), as well as hard acceleration (forward), hard deacceleration (braking), and hard turning (left and right) events. In other words, velocity, acceleration (forward), braking (reverse acceleration or deacceleration) and cornering (left and right acceleration) are calculated. A particular driving event is detected when one or more thresholds are met.

Evaluating or processing some or all of the currently stored sensor data, the processor 310 determines or detects when a forward acceleration event occurs (step 460d1), a braking (deacceleration) event occurs (step 40d2), a left turn event occurs (step 40d3), and a right turn event occurs (step 40d4). In addition, GPS sensor data and acceleration sensor data may be processed to calculate velocity/speed of the driver/vehicle device 108a (step 460d5) and compared to a predetermined velocity/speed threshold to determine or detect that a high-speed event has occurred (step 460d6). For example, the high-speed event may be detected when the highest posted speed limit in the delivery geographical area is exceeded by a predetermined amount, or when a global highest speed limit is used as a threshold (e.g., all stores implement a policy that no delivery driver can exceed 55 mph regardless of actual speed limits).

This foregoing processed sensor data/information may be referred to as "processed sensor data." Additional system or device type data may be generated and stored along with the raw and/or processed sensor data, such as data that describes other attributes or characteristics of the driver/vehicle device 108a or environment (e.g., device ID, employee number, date, timestamp, humidity, temperature etc.) as desired. Collectively, the raw sensor data, processed sensor data and system/device data may be referred to hereinafter as "delivery event data."

Detecting an acceleration event (step 460d1) may include comparing acceleration data to a forward acceleration threshold and determining occurrence of a hard forward acceleration event when actual acceleration data exceeds the threshold. In one example embodiment, the acceleration threshold may be 2.5 meters/second$^2$ (250 cm/s$^2$ or approx. 0.244 G). Although the inventors have performed real-life testing and simulation to determine the foregoing acceleration threshold value of 2.5 meters/second$^2$ provides an acceptable safety threshold, other values for the threshold may be chosen, including those that may be based on objectively-determined (i.e., third party) safe/unsafe driving standards for acceleration if publicly available now or in the future. As will be appreciated, additional safety conditions, parameters and thresholds may be utilized for each of the acceleration thresholds. For example, a single event acceleration threshold (e.g., a single occurrence exceeding the threshold at any time) may be utilized to trigger a detected driving event, or a continuous event acceleration threshold (e.g., exceeding the threshold for a predetermined period of time) may be used to trigger detection of a driving event. For example, to trigger the hard acceleration driving event, the acceleration data should exceed the threshold over a given time period, e.g., 1.5 second period. Single erroneous and very short periods of acceleration above the threshold would be filtered out in this manner.

An accelerometer sensor outputs physical acceleration (change of velocity) data which may be calibrated or uncalibrated and may include gravity measurements. The acceleration data is reported in the x(Pitch), y(Roll) and z(Yaw) axes (m/second). In order to focus on linear acceleration/deceleration of a vehicle, the accelerometer sensor may require intermittent calibration, force of gravity calculation and its elimination/filtering (when due to elevation changes) from the measurements. Generally, to get more accurate acceleration data and detection of a hard acceleration event, the orientation of the driver/delivery device 108a should be measured (using a combination of acceleration and orientation sensor data) and processed to determine a more accurate measure of linear acceleration based on the reported acceleration data. However, the orientation (bearing, tilt, physical position) of the driver/vehicle device 108a can change irrespective of the vehicle position/bearing. Further, a calibration process may also be performed at different times for calibrating the accelerometer and/or gyroscope. Persons of skill in the art would readily understand these issues and can program or otherwise develop algorithms for addressing some of these issues.

In another embodiment, in lieu of performing the above (calibration, calculating gravity effects, and processing 3-axis acceleration data from the accelerometer, etc.) that may be necessary to obtain more accurate linear acceleration data and enabling detection of a hard acceleration event, acceleration rate may be calculated based on previous and current speed information over time. The accuracy of this method relies on the accuracy of the speed calculation and position/location data.

In yet another embodiment, to reduce some of the issues noted above, the driver/vehicle device 108a may be disposed within a mounting system fixed in a particular orientation within the delivery vehicle. In this way, the orientation of the driver/vehicle device 108a would be known and can be taken into account when processing acceleration data to detect any acceleration event. In embodiments in which the driver/vehicle device 108a is disposed in a fixed position within the vehicle, additional filtering techniques (e.g., low pass filtering out mechanical-induced vibrations) or functions may need to be implemented in the application 334 to increase accuracy—as mounted devices tend to vibrate more in a moving vehicle which might skew accelerometer and gyroscope data measurements.

As will be appreciated, some or all of issues described with respect to detection of a hard forward acceleration event, are equally applicable to detection of hard braking, hard right turn, and hard left turn events. Similarly, detecting a hard braking event (step 460d2) may include comparing reverse acceleration data to a hard braking threshold, and determining occurrence of a hard braking event when actual acceleration data (in this case, deceleration) exceeds the threshold. In one example embodiment, the hard braking threshold may be 3.3 meters/second$^2$ (330 cm/s$^2$ or approx. 0.337 G). Although, the inventors have performed real-life testing and simulation to determine the foregoing braking threshold value of 3.3 meters/second$^2$ provides an acceptable safety threshold, other values for the threshold may be chosen, including those that may be based on objectively-determined (i.e., third party) safe/unsafe driving standards for acceleration if publicly available now or in the future.

Detecting a hard left turn event (step 460d3) or a hard right turn event (step 460d4) may include analyzing and processing both acceleration data (accelerometer) and orientation data (gyroscope) with a comparison to a hard left turn threshold (or hard right turn threshold), and determining occurrence of a hard left turn event (or hard right turn event) when the actual acceleration and orientation data exceeds the threshold. In one example embodiment, the hard left turn threshold may include: orientation data indicating a left turn and an acceleration threshold of 3.5 meters/second$^2$ (350 cm/s$^2$ or approx. 0.357 G). Although, the inventors have performed real-life testing and simulation to determine the foregoing left turn acceleration threshold value of 3.5 meters/second$^2$ provides an acceptable safety threshold, other values for the threshold may be chosen, including those that may be based on objectively-determined (i.e., third party) safe/unsafe driving standards for acceleration if publicly available now or in the future. Similarly, the hard right turn threshold may include: orientation data indicating a left turn and an acceleration threshold of 3.5 meters/second$^2$ (350 cm/s$^2$ or approx. 0.357 G). Although, the inventors have performed real-life testing and simulation to determine the foregoing right turn acceleration threshold value of 3.5 meters/second$^2$ provides an acceptable safety threshold, other values for the threshold may be chosen, including those that may be based on objectively-determined (i.e., third party) safe/unsafe driving standards for acceleration if publicly available now or in the future.

In another embodiment, a driving event may be detected when (i) acceleration is greater than about 2 meters/second$^2$ for forward acceleration, (ii) acceleration is greater than about 3 meters/second$^2$ for reverse acceleration (braking), and (iii) acceleration is greater than about 3 meters/second² for right/left turn acceleration.

As will be understood, the detection of an unsafe forward acceleration, unsafe braking or unsafe right/left turn driving event may be triggered when the measured acceleration data exceeds the threshold in a single instance (one-time). In other embodiments, the detection may not occur (for one or more of each type of event) until the measured acceleration data exceeds the threshold for a predetermined time period, such as 1 or 2 seconds. In one example embodiment, an unsafe forward acceleration driving event is detected when the acceleration threshold is exceeded over 1.5 seconds. Similarly, an unsafe braking driving event is detected when the braking threshold is exceeded over 2 seconds. Likewise, an unsafe right/left turn driving event is detected when the turn threshold is exceeded over 2 seconds. Shorter or longer time periods may be chosen, as desired and/or based on the particular application and environment.

The above examples of acceleration thresholds are applicable for acceleration data generated by the accelerometer sensor (and/or gyroscope). In other embodiments, acceleration data from the GPS sensor may be utilized instead of, or in addition to, acceleration data from the accelerometer. In these embodiments, the thresholds may be slightly different based on timer or occurrences in the device settings. For example, the thresholds when using GPS acceleration data may be about 2.6 meters/second² (acceleration), 2.6 meters/second² (braking), 3.7 meters/second² (acceleration left), and 3.7 meters/second² (acceleration right). In other embodiments, if the GPS data generation timing is set to a particular frequency of, for example, 0.5 seconds, then to utilize detection over a time period (as described in the foregoing paragraph), a predetermined number of times (occurrences) the GPS acceleration data exceeds the threshold will trigger or detect a particular unsafe acceleration-based driving event. Using the 1.5, 2, 2 and 2 second time periods above, respectively, and a 0.5 second GPS data generation frequency, then the occurrences thresholds would be 3, 4, 4 and 4, respectively. Any suitable accumulator(s) or accumulating function(s) may be utilized to implement this feature. Therefore, the occurrences thresholds for each event may require adjustment depending on the frequency of data collection.

As will be appreciated, the accelerometer (and gyroscope) data or the GPS data, or both, may be utilized in the detection of the described unsafe driving events.

To calculate or obtain speed/velocity data (step 460d5), various methods may be utilized. In one embodiment, the application 334 processes the position/location data (e.g., from the GPS module 325a) and calculates speed/velocity based on change in position over time.

In another embodiment, velocity/speed may be calculated using a FusedLocation provider/application that intelligently combines position data from multiple location sources, such as the internal GPS module 325a and WiFi data to generate more accurate geographical location information based additionally on context (e.g., is the device within a building with thick walls, or is the device sitting in a moving vehicle in a wide open road), which then is used to calculate velocity or speed. However, low accuracy levels may occur if the device receives a lot of interference from bouncing signals (attenuation), which in turn may cause inaccurate velocity calculations from the location information. Such conditions may trigger velocity spikes even while the device is not physically moving. To mitigate this, a low pass filtering mechanism may be implemented to smooth/filter out these spikes, and filtering out (i.e., discarding) highly inaccurate location points may also provide improvement. Additionally, performing velocity calculations may be limited to only times when the driver/vehicle device 108a is moving. This would eliminate any potential errors occurring when the device is stationary.

In yet another embodiment, the velocity/speed may be monitored and/or calculated using a third-party application downloaded and executing on the driver/vehicle device 108a, such as Speed Box™ or other similar application. A person of ordinary skill in the art could readily integrate such available application into the driver/vehicle device 108a and utilize the velocity/speed measurement/output from the application and desired times/frequency and store the velocity/speed data for inclusion into data transmitted to the enterprise server 102.

After speed/velocity is calculated, detecting a high-speed event (step 460d6) may include comparing the calculated speed/velocity to high-speed threshold, and determining occurrence of a high-speed event when the calculated speed/velocity exceeds the threshold. In one example embodiment, the high-speed threshold may be 55 miles/hour. Other threshold values may be chosen. In addition, as noted above with respect to acceleration thresholds, the thresholds may be further based upon a time period—such as detecting a high speed event when the velocity exceeds the value threshold over 1 or 2 seconds. A particular threshold may be chosen based on the application or environment. In another embodiment, the highest speed limit of all streets within the delivery area can be used as the high-speed threshold.

It will be understood that when a particular driving event is detected, additional information identifying the location/position and the time the detected event occurred is stored along with a driving event identifier. Such additional information may include latitude/longitude data (such as GPS position data) and timestamp data.

Next, all or select portions of the delivery event data associated with time T1 are stored as a block of data in the memory 330 for subsequent transmission to the enterprise server 102 (step 460e). In one embodiment, all of the delivery event data may be transmitted to the enterprise server 102. In other embodiments, current GPS/position data, calculated velocity/speed data, and any detected event information associated with time T1 (e.g., timestamp T1) are stored in the memory 330 as a block of data for later transmission. In addition, the steps of generating sensor data (step 460b), storing the sensor data (step 460c), processing the sensor data to detect one or more driving events (step 460d), and storing delivery event data for later transmission (step 460e) are repeated—at the sensor sampling rate. In other words, a first set of sensor data generated at time T1 is stored and processed, and all or some of the sensor data and processed sensor data/information is stored and associated with the time T1. A next set of sensor data generated at time T2 is similarly processed and stored, and so on. In other embodiments, accelerometer and gyroscope sensor data may be continuously generated and processed, or processed at a higher rate than GPS data.

By analyzing and processing the delivery event data (accelerometer, gyroscope, GPS data, etc.) within the driver/vehicle devices 108a and analyzing, determining and/or detecting the above-described driver events—as opposed to performing these functions at a remote device, such as the server 102—the amount of data transmitted from the driver/vehicle device 108a to the server 102 is substantially reduced which saves bandwidth and costs. In addition, if certain events are deemed important or severe, the detection thereof by the driver/vehicle device 108a enables a faster notification to the appropriate person/server.

In other embodiments, when a driving event is detected, the driving event identifier, GPS position data and timestamp data may also be immediately transmitted to the enterprise server 102 to notify the server 102 that a specific driving event has been detected, along with the time and location of the event. As will be appreciated, when detected, immediate notification to the enterprise server 102 of crucial detected driving events that likely affect safety may be desired—instead of (or in addition to) transmitting the event detection at a later, scheduled time.

During a delivery event, the sensing and tracking system 325 (using the location/position sensing/determining device 325a, the accelerometer 325b and/or the gyroscope 325c) senses and collects tracking and safety/driving data (position data, acceleration data, orientation data, etc.). The frequency or sampling rate of the data collection can be chosen as desired, and may depend on the desired level/accuracy of data as needed. In one embodiment, raw position sensor data may be generated and stored every 0.5 seconds, while raw accelerometer and/or gyroscope (orientation) sensor data may be generated and stored every 0.5 seconds (or more frequently or continuously). In other embodiments, these rates could be desirably set anywhere between about 0.1 and 2 seconds, or could be programmable depending on the portion of time during the delivery event (e.g., pre-delivery, delivery, post-delivery, see below). Different types of data may be sampled at different rates. Such data is collected and stored continuously at specified rate(s) during the delivery event. Similarly, the frequency of processing the raw sensor data to generate processed sensor data (e.g., velocity/speed, hard acceleration/braking/turn events) can be chosen as desired, and may depend on the desired level/accuracy of data as needed. In one embodiment, processed sensor data may also be generated and stored every 0.5 seconds.

As will be appreciated, the location/position data is generated by the location/position sensing/determining device 325a, such as a global positioning system (GPS) module or other similar device. The acceleration data (e.g., rate of change in velocity) is generated by the accelerometer 325b (e.g., a 3-axis digital accelerometer), while the orientation information is generated by a gyroscope 325c (e.g., a MEMS gyroscope or inertial measurement unit). Such devices/sensors are commercially available, and their operations are well understood by those skilled in the art. Generation of this data (or certain portions of this data) may occur continuously or periodically. Alternatively, the sensor data may be generated continuously at a high rate and stored at predetermined times (e.g., intermittently) as desired.

In other embodiments, the rate of sensing and collection of raw sensor data may be lower during the pre-delivery and post-delivery periods as compared to the delivery period. This is because during these two pre- and post-time periods, the driver/vehicle device 108a is predominantly in a non-moving condition, such as waiting for the delivery driver to pick up order, exit store and enter vehicle to begin delivery trip, and after delivery trip waiting for delivery driver to exit vehicle, enter the store, and cash-out or otherwise terminate the delivery, respectively. In one example embodiment, the sensing and collecting rate may be 5 seconds during the pre-delivery and post-delivery periods, while the rate may be 0.5 seconds during the delivery period. Likewise, the rate of processing the raw sensor data to generate processed sensor data (e.g., velocity/speed, hard acceleration/braking/turn events) during pre- and post-time periods can be chosen as desired, and in one embodiment, may even be omitted due to a low likelihood of movement during these time periods.

Some or all of delivery event data (including system/device data) generated and stored during the delivery event is accumulated for a period of time (step 460f) and then transmitted (downloaded) periodically or at scheduled times from the driver/vehicle device 108a to the remote server 102 (step 460g). The rate or frequency of download is typically lower than the sensor data sampling rate, and may also depend on the quality of service available for communications. For example, the stored data may be downloaded every ten seconds, while the raw sensor and processed data (speed, detection event) may be generated and stored every 0.5 seconds. In this example (sampling at 0.5 seconds), twenty sets (T1-T20) of raw sensor data and processed data is transmitted every ten seconds In other embodiments, the stored and accumulated delivery event data (or select portion(s) thereof) may be transmitted in real time or at different times during the delivery event. In other embodiments, the rate of transmission could desirably be set anywhere between about 1 and 100 seconds, between about 5 and 30 seconds, or between about 8 and 15 seconds. In some embodiments, only stored detected driving events and related stored position data may be transmitted.

Although all of the delivery event data may be periodically downloaded to the enterprise server 102, in one embodiment, the downloaded information may be limited to position data, velocity/speed data and processed hard acceleration/braking/turn events (including include system/device data such as device ID, timestamp). It will be understood that raw acceleration and orientation sensor data may not be necessary or utilized at the enterprise server 102 but instead, the driver/vehicle device 108a will process this information to determine whether a hard acceleration/braking/turn event has occurred, and if so, an indication/value of the event may be transmitted to the enterprise server 102 along with position and timestamp information. Such embodiment reduces the amount of transmitted data. In addition, certain data may be downloaded immediately, such as a calculated velocity/speed or hard acceleration/braking and right/left turn events exceeding a predetermined threshold. In such case, priority transmission may occur without waiting for the next transmission window.

It will be understood that during the delivery event (e.g., delivery trip), delivery tracking and driving sensor data is collected and intermittently transmitted by the driver/vehicle device 108a to the enterprise server 102 for a given customer order during the process 460. Upon receipt, the enterprise server 102 stores the received delivery data with the previously stored customer order/information record. This repeats for each set of delivery data downloaded and received by the enterprise server 102 during the delivery event. Eventually, the customer's order is delivered to the delivery address and the driver/vehicle device 108a returns to the store.

During the delivery event, the store portal device 104 receives tracking data from the enterprise server 102 identifying a current position/location of the device 108a (based on the delivery data received at the server 102 from the device 108a). The portal device 104 displays the store's delivery area map showing the current position of the device 108a thereon. This process repeats during the delivery event and enables real-time display of the device 108a location for viewing at the store.

During the delivery event, the application 334 (executing within the driver/vehicle device 108a) may continuously monitor for the end of the delivery trip for the associated delivery driver/vehicle device 108a (step not shown in Figures). When the end of the delivery trip is detected, the device 108a enters the post-delivery period and reduces the sensing and collection process, such as reducing it from 0.5 seconds to 5 seconds during the post-delivery period. And, during the post-delivery period, the delivery/vehicle device 108a may still be intermittently transmitted to the enterprise server 102. As described previously, any suitable event(s) can be selected to trigger detection of the end of the delivery trip (i.e., beginning of the post-delivery period), including non-movement events, returning to the home store location, a geofencing event, user input, and the like.

During the delivery event, the application 334 (executing within the driver/vehicle device 108a) also continuously monitors for the end of the delivery event for the associated driver/vehicle device 108a (step 465). When the end of the delivery event is detected, the driver/vehicle device 108a terminates the tracking and safety collection process 460 (step 470) and transmits all remaining accumulated stored data to the remote server 102 that was not previously transmitted to enterprise server 102 (step 475). As described previously, any suitable event(s) can be selected to trigger detection of the end of the delivery event, including user input at the store POS system 106 or user input to the driver/vehicle device 108a with further communication to the store POS system 106. Such further communication may include other communication channels or paths (wired or wireless, such as BlueTooth, WiFi, NFC, optical, etc.) between the driver/vehicle device 108a and the store POS system 106, and in one embodiment, is implemented using near field communication (NFC) and NFC interfaces in the devices.

Once the delivery event has ended, the store POS system 106 recognizes the customer order and delivery is complete and transmits an order complete notification message to the enterprise server 102 (step 480) and the stored customer order is marked or otherwise identified in the remote server 102 as completed.

Figure 6:
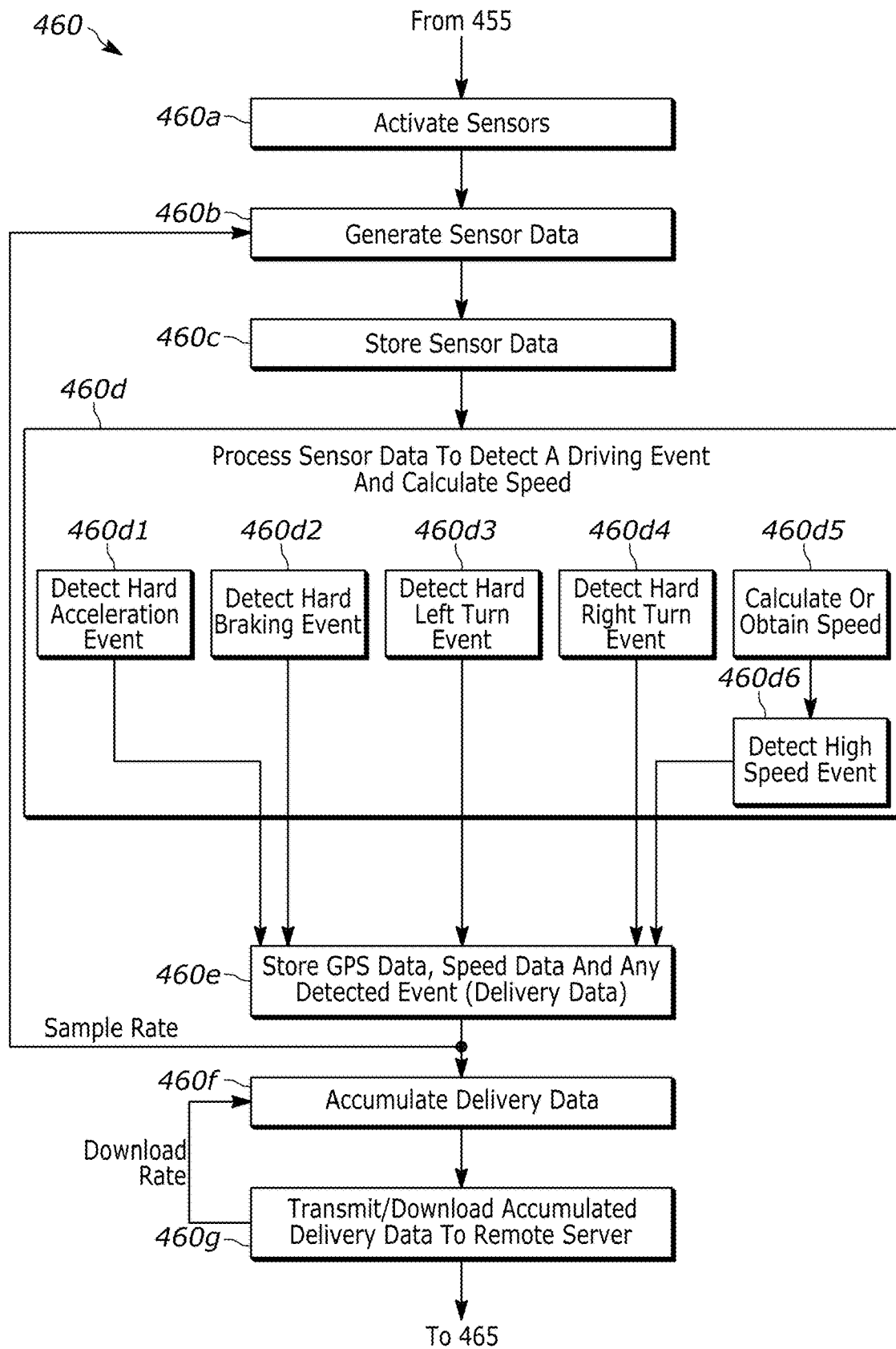
FIG. 6 is a more detailed flowchart of various steps included within the process 460 shown in FIG. 4B.

It will be understood that each driver/vehicle device 108 (e.g., 108a, 108b, etc.) active within a store/delivery area will perform all or most of the steps and functions described in the process 400 (FIGS. 4A and 4B) as well as the process 460 (FIG. 6).

Figure 5:
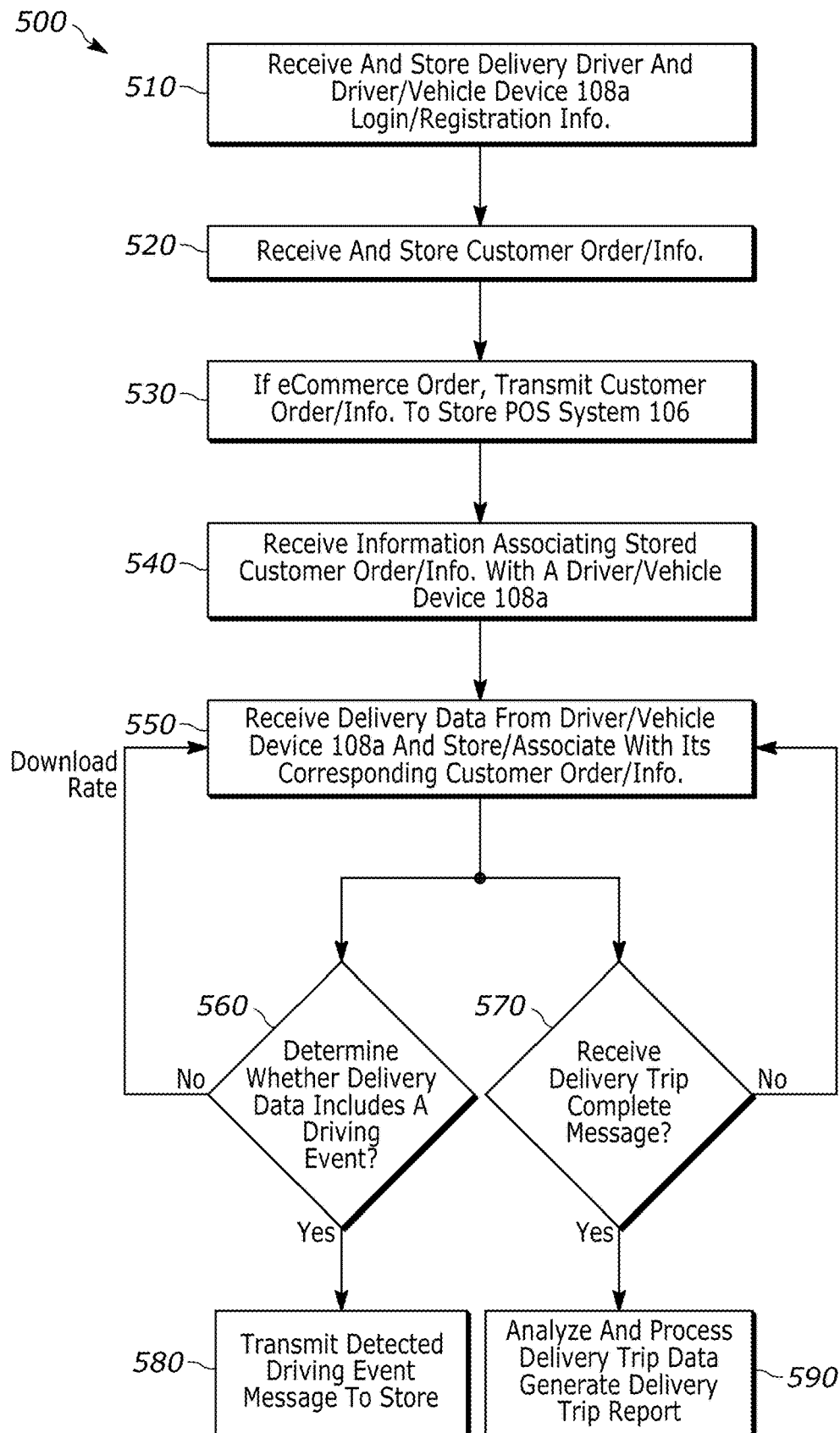
FIG. 5 illustrates a flowchart of a method or process performed by a server/network device within the system described in FIG. 1 in accordance with various embodiments of the present disclosure.

Now turning to FIG. 5, there is shown a flow chart of an example method or process 500 performed by the enterprise server 102, including generally speaking, communicating with the local store devices (e.g., the store POS system 106 and store portal device 104) and driver/delivery devices 108, receiving, evaluating and processing delivery event data generated and transmitted from the driver/vehicle devices 108, generating delivery trip reports and scores, and transmitting these to the local store devices for driver training and assessment purposes.

The method 500 includes receiving and storing delivery driver and driver/vehicle device 108 login/registration information (step 510). This information may be received from an applicable store POS system 106 or the driver/vehicle device 108a via the network 101. As will be appreciated, this generally corresponds to and forms part of the delivery driver login/registration process 405 (illustrated in FIG. 4A and previously described above).

The enterprise server 102 receives and stores customer order/information at the enterprise server 102 (step 520). As previously described with reference to steps 410-430 of FIG. 4A, a customer order may be received as a local store order or an ecommerce order. When a local store order, it is initially received/stored at the store POS system 106 (step 425) and subsequently transmitted (step 430) and received/stored at the enterprise server 102 (step 520). When an ecommerce order, it is initially received/stored at the ecommerce server 102a which then transmits the customer order/information to the enterprise server 102 (step 415/step 520), and the enterprise server 102 transmits the customer order/information to the applicable store POS system 106 (step 420/step 530).

After receiving and storing a customer order/information (step 520), and after the customer order is processed by the store and ready for delivery, the enterprise server 102 receives dispatch delivery data transmitted from the store POS system 106 (at step 450). Indicating dispatch or start of a delivery event, this data also includes information (assignment data) enabling the enterprise server 102 to associate a stored customer order/information with a particular driver/vehicle device 108a (or driver) having been assigned to deliver that order (step 540).

During the delivery event, the enterprise server 102 repeatedly receives delivery data downloaded from the driver/vehicle 108a and stores the received delivery data in association with the corresponding stored customer order/information record (step 550). This generally corresponds to step 460g within the process 460 (as shown in FIG. 6). When the process 500 proceeds to step 550, the enterprise server 102 can be described as being in a delivery data reception mode. The rate of download is typically set or determined by the application program 334 executing with the device 108a (see previous description of steps 460f and 460g and download rate, which may be periodically, intermittently, continuously or in accordance with some other event or scheme). For ease of reference, all received and stored delivery data applicable or attributable to the corresponding stored customer order/information record can be referred to as "delivery trip data" for a particular customer order.

It will be understood that transmission of the delivery data from the driver/vehicle devices 108 to the enterprise server 102 may be implemented in different ways, including in a connection or connectionless manner. In a connection-oriented embodiment, at a defined point in time, the application 334 within the driver/vehicle device 108a establishes and implements a continuous connection with the remote server 102. Although the point in time when such connection is initiated and established may be chosen as desired, such point could be at the time of dispatch of a delivery event or at the time of login/registration with the remote server. This connection is maintained until completion of the delivery event or until logout. With an established connection, a heartbeat process may be performed between the enterprise server 102 and the device 108a and utilized for various purposes and functions. For example, if an expected heartbeat signal is no longer being received by the enterprise server 102, the applicable store POS system 106 can be notified or alerted that the driver/vehicle device 108 has lost communication/connection with the enterprise server 102 or has experienced some other problem.

In a connectionless embodiment, each time the driver/vehicle devices 108 is ready to transmit a set of delivery data to the enterprise server 102, a new connection is established, the data is transmitted, and the connection is terminated. This may be beneficial depending on the application.

Figure 8:
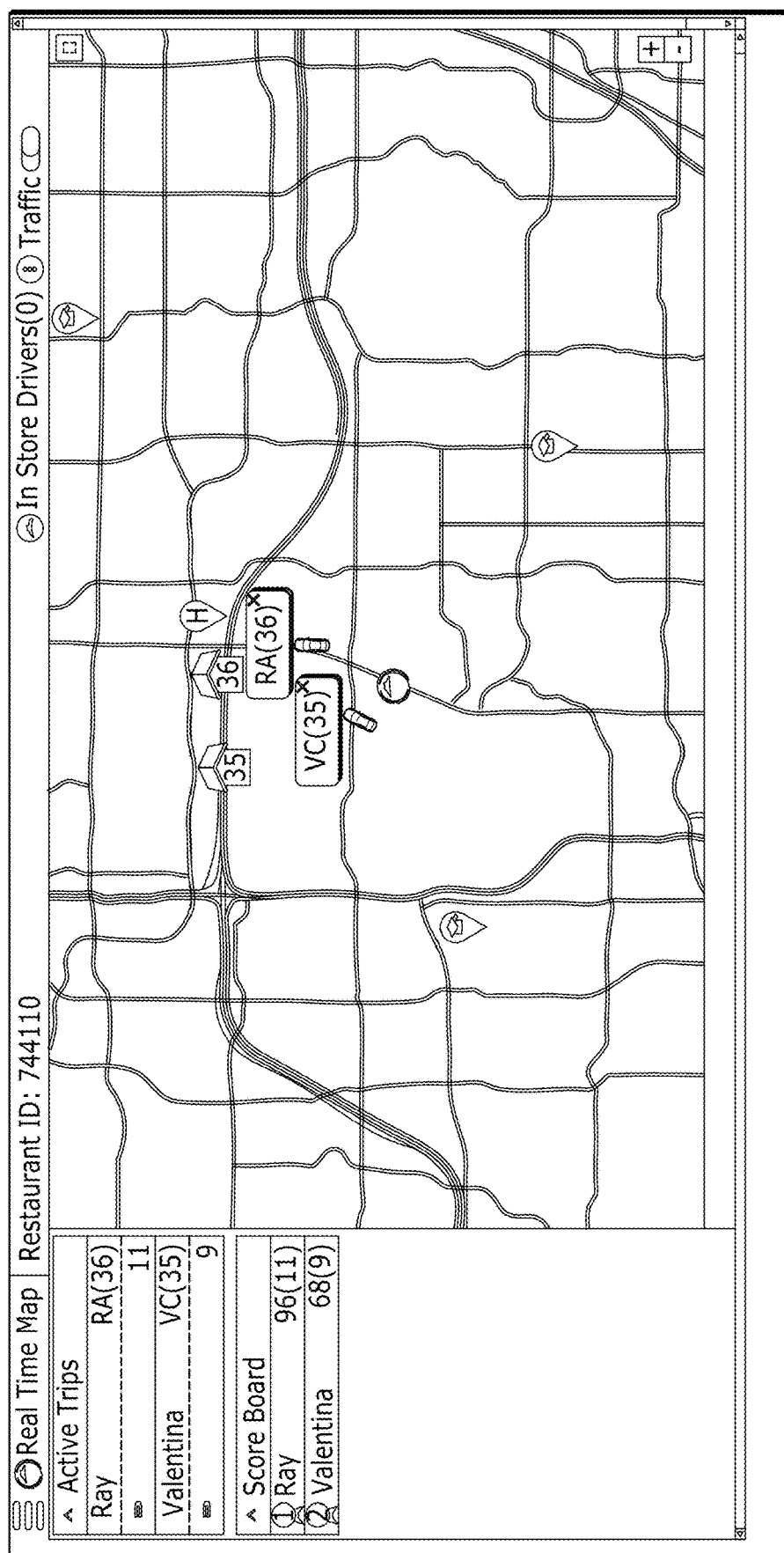
FIG. 8 is an example display or graphical depiction illustrating real-time tracking/location of two driver/vehicle devices during two respective active delivery trips.

Each set of delivery data received at the enterprise server 102 is further analyzed to determine whether it includes a detected driving event (step 560). If none are included, the process awaits the next set of delivery data. If included, the enterprise server 102 transmits a detected driving event message to the store POS system 106 or portal device 104 with information describing the detected driving event (step 580). At the store, the detected driving event information can be displayed or otherwise conveyed to an employee, such as a manager. In addition, at this time, the enterprise server 102 may also routinely transmit present tracking/position data of the device 108*a* (and all other active devices 108) to the store portal device 104 (not shown in FIG. 5) for displaying in a real-time tracking and delivery map configuration (e.g., as illustrated in FIG. 8). This data identifies a current position/location of the device 108*a* (based on the delivery data received at the server 102 from the device 108*a*), and the portal device 104 can display the store's delivery area map showing the current position of the device 108*a* thereon. This process repeats during the delivery event and enables real-time display of the device 108*a* location at the store. As will be understood, this process occurs for all active driver/vehicle devices 108 associated with Store 1 in the delivery area 120 (for display by the store portal device 104 at Store 1), as well as for all active driver/vehicle devices 108 associated with Store 2 in the delivery area 140 (for display by the store portal device 104 at Store 2).

While in the delivery data reception mode, the enterprise server 102 monitors for receipt of an order complete notification message that indicates the delivery event is complete (or otherwise has been terminated) (step 570). When received, this message informs the enterprise server 102 that the customer order has been delivered and is complete, and the stored customer order (and its associated delivery trip data) is marked or otherwise identified in the enterprise server 102 as complete.

The method 500 continues and the enterprise server 102 analyzes and processes the stored delivery trip data (associated with the stored customer order) and generates a delivery trip report (step/process 590). In one embodiment, the enterprise server 102 may wait an additional predetermined period of time (not shown) before performing the step 590. A short waiting period (e.g., 30 seconds) may be implemented to ensure that all delivery data has been downloaded from the driver/vehicle device 108*a* to the enterprise server 102 before processing begins to generate the delivery trip report. A much longer waiting period (e.g., 30 minutes or more) may be implemented depending on availability of computing and other resources utilized for processing the data and generating a delivery trip report. Also, the process 590 may be manually initiated at a desired time.

In another embodiment, at the step 480, the store POS system 106 may, after recognizing the customer order and delivery is complete, delay transmitting the order complete notification message to the enterprise server 102 (step 480) for a short period of time to enable all delivery data to be downloaded from the driver/vehicle device 108*a* to the enterprise server 102 before step/process 590 begins (or is authorized to begin).

In other embodiments, one or more data servers (not shown in FIGs) may store the delivery trip data (for a stored customer order) received from the driver/vehicle devices 108 during a delivery event—instead of or in addition to the enterprise server 102. The enterprise server 102 may obtain the delivery trip data from such data server(s), and then process it to generate the delivery trip report (e.g., at step 590).

It will be further understood that the enterprise server 102 will perform the steps and functions described in the process 500 (FIG. 5) as multiple instantiations of the process 500—one for each driver/vehicle device 108 (e.g., 108*a*, 108*b*, etc.) active within a store/delivery area.

Figure 7A:
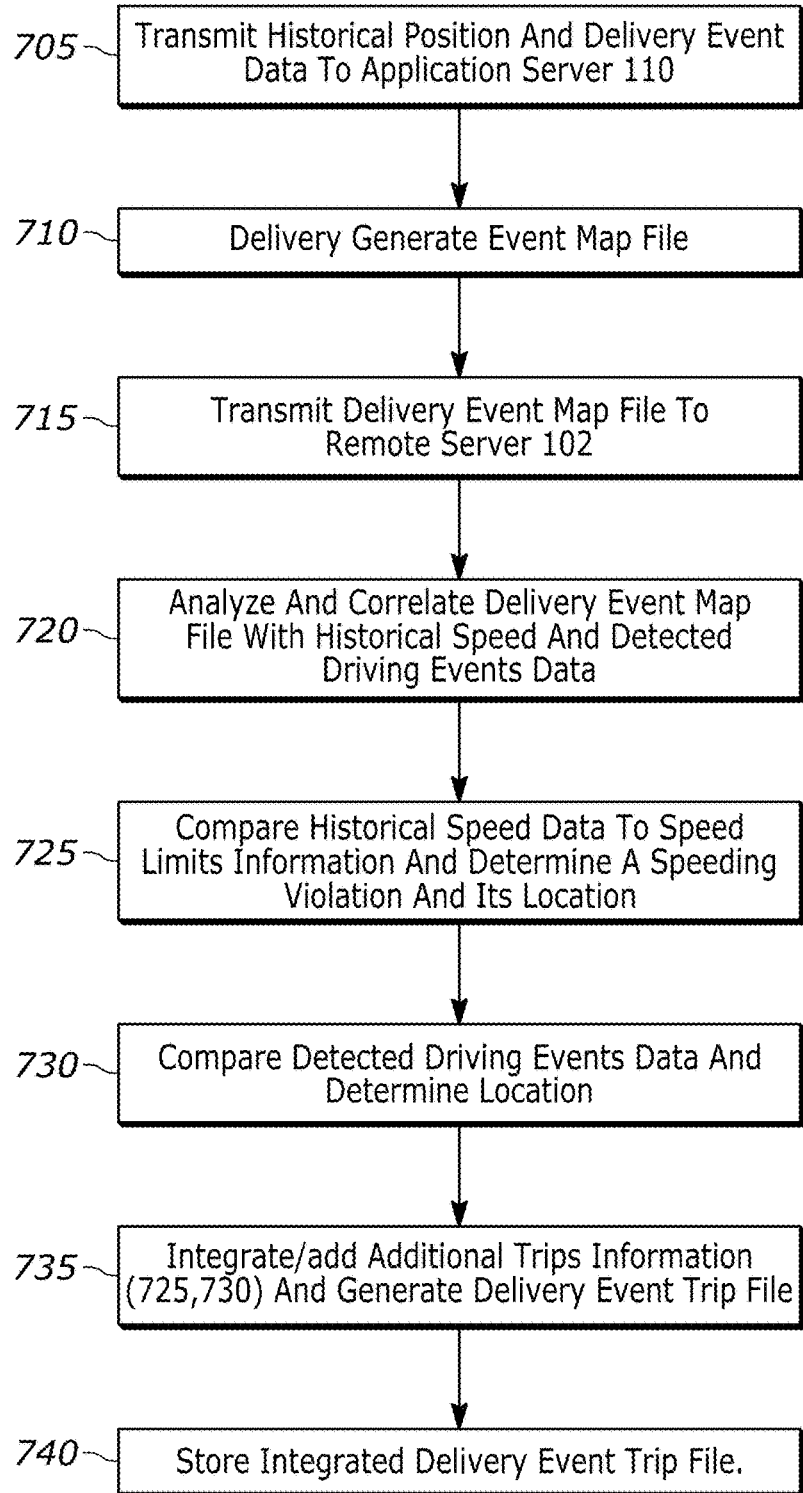
FIGS. 7A and 7B describes a more detailed flowchart of various steps included within the process 590 shown in FIG. 5 and additional steps performed by the remote server 102.
Figure 7B:
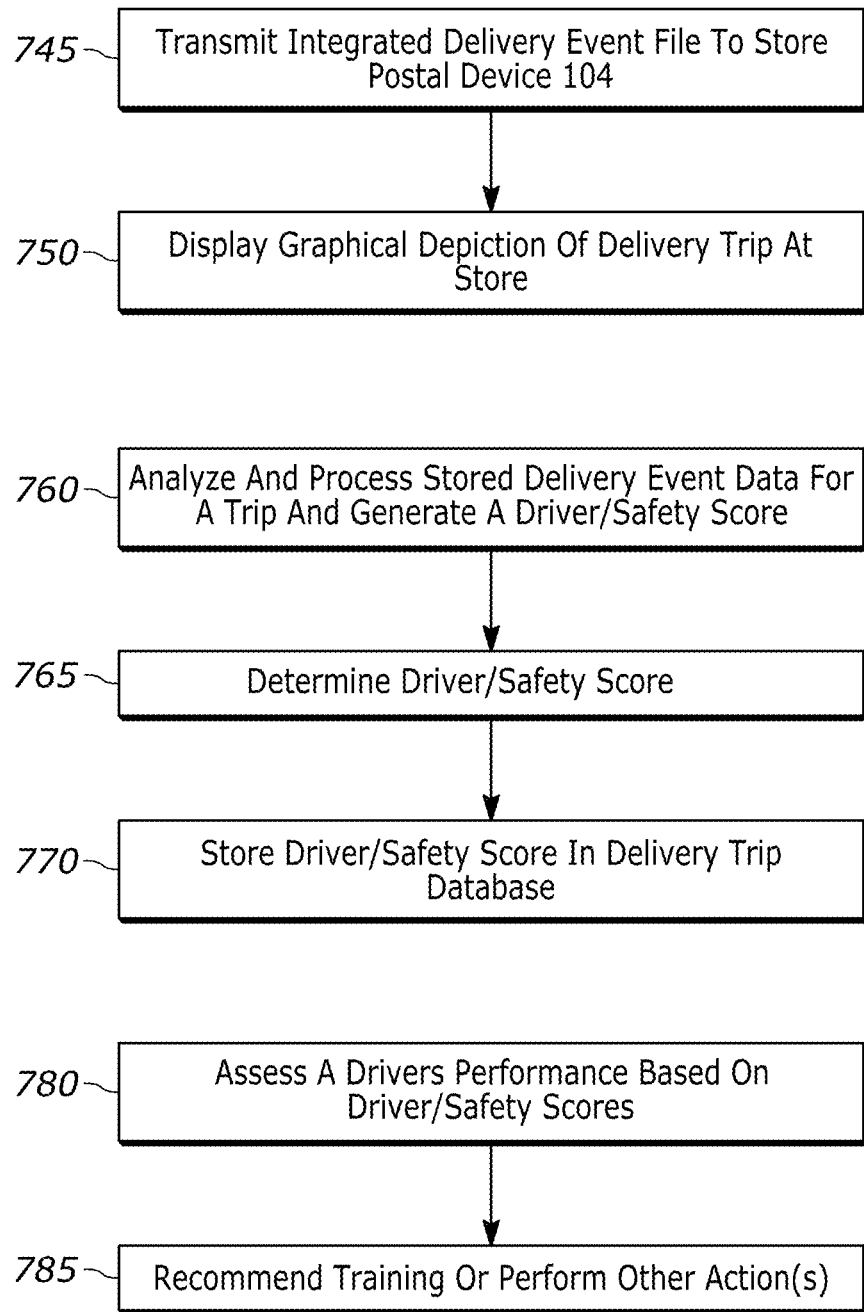

Now turning to FIGS. 7A and 7B, there is illustrated a more detail flow diagram of the step/process 590 in accordance with the present disclosure.

During the process 590, the enterprise server 102 transmits historical position data of the delivery event/trip to an application server 110 (as shown in FIG. 1) (step 705). The application server executes an application program and generates a delivery event map file which includes necessary information describing the travel path of the device 108*a* (step 710). In essence, the delivery event map file is a set of data representing or describing the geographical or path of the delivery event trip (e.g., travel path from store to delivery address and back to store). Once produced, the delivery map trip file is communicated back to the enterprise server 102 (step 715).

In one example, the application server 110 may be hosted by a third party, such as Google, and the application program may be Google's Roads API application (with Snap to Roads, Speed Limits modules, etc.). The application server 110 receives and maps a set of historical GPS data points to the geometry of the roads within a given map area, and generates the delivery event map file. This may also include information about the posted speed limits for each road segment along the travel path. In another embodiment, the enterprise server 102 may include a custom or other third party application program to perform these functions and processing at the enterprise server 102.

At the enterprise server 102, the received delivery event map file information is analyzed and correlated with the device's historical speed data and detected driving events data for the delivery event (step 720). The historical speed data along the travel path can be compared to the speed limits information to determine whether a speeding violation has occurred and its location (step 725). Similarly, the detected driving events data can be analyzed and their location(s) determined (step 730). The enterprise server 102 then integrates this additional trip information with the delivery map trip file enabling the display of any speeding violation and any detected driving events on the road segments map (step 735). This integrated delivery event trip file is stored at the enterprise server 102 (or elsewhere) for historical purposes (step 740).

In another embodiment, the enterprise server 102 may optionally perform the step 460*d*6 and determine the detection of a high speed event instead of the device 108 performing this step and determination.

In a different embodiment, the application program executing at the application server 110 may also have functionality and capability to also receive, in addition to the historical GPS position data, the historical speed and detected driving events data and generate the integrated delivery event trip report with all this information integrated therein.

The integrated delivery event trip file is transmitted to the store portal device 104 (executing an application compatible with the file) (step 745) and a graphical depiction of the delivery trip is displayed at the store (750) based on the received trip file. This can be stored at the store portal device 104 for playback at a later date, or may be requested from the enterprise server 102 at any desired time for review. Thus, a graphical depiction of the trip as shown on a delivery area map will include not only the travel path, but also display the location/info of any relevant detected driving events (e.g., high speed, speed limit violation, hard acceleration/braking/turn). The graphical depiction (rendering or reproduction) may be in the form of a single display image with highlighting illustrating the travel path on the map, and may identify detected driving events at specific points of occurrence. Such rendering or reproduction may be in the form of a graphical still image or video illustrating movement of the driver/vehicle device 108a during the delivery event. In most embodiments, the delivery event trip is overlaid on a street map of the delivery area.

Figure 11:
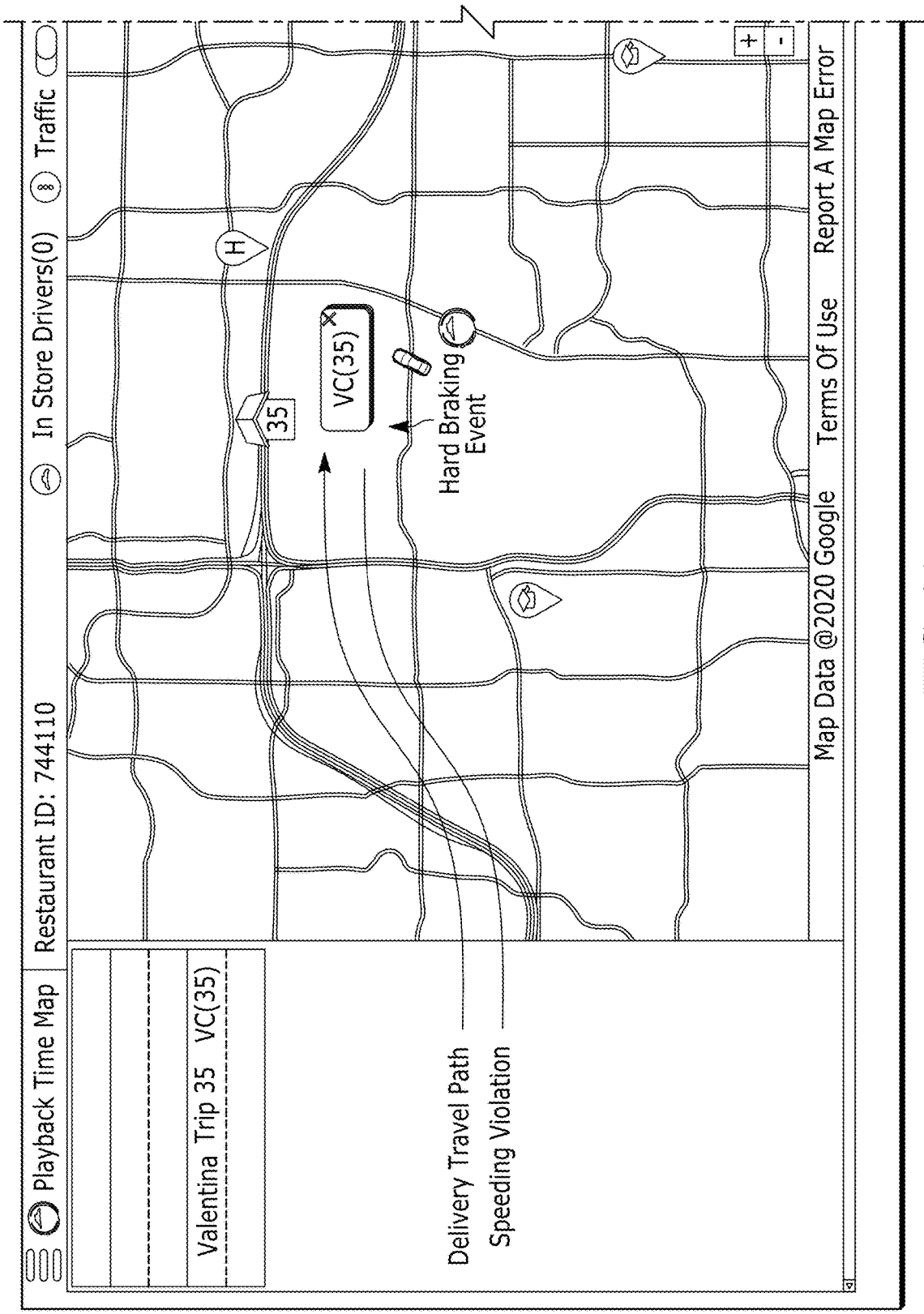
FIG. 11 is an enlarged view of a window pane area illustrating a scoreboard feature as shown on the example display or depiction in FIG. 8.

In other words, the generated delivery trip report is an integrated "packaged' trip report including time and position correlated data and any detected events which enables the displaying of a graphical representation of a delivery trip. This may be displayable as static image(s) or video overlaid on a geographical map of the delivery area of a given store—for display on the store portal device 104 in a store. FIG. 11 illustrates one graphical representation of a delivery trip. The travel path taken by the device 108a is shown in as a thick black line overlaid on the street map. The store location and delivery address are also identified. Two points on the delivery path each indicate the occurrence of a detected driver event. One point identifies the location of a hard braking event, while the other point identified the location of a speeding violation.

Graphical displays or depictions of completed delivery trips, such as the one shown in FIG. 11, enable later playback or review of the delivery trip for training purposes. A manager and/or the delivery driver can review the delivery trip travel path, as well as see the location of any detected driving events.

As will be appreciated, all or some of the steps in process 490 performed for processing, generating a delivery event trip report, and transmitting the delivery event trip report to a store, and displaying playback of a delivery trip, will be repeated for each delivery event for each driver/delivery device 108.

Now turning to FIG. 8, there is shown an example display or graphical depiction illustrating real-time tracking/location of a first driver/vehicle device 108a (identified as "VC(35)") and a second driver/vehicle device 108b (identified as "RA (36)") each in the midst of an active delivery trip (delivery to a delivery address). The store location is shown on the map, along with the store delivery area (shaded in gray). Two separate delivery addresses depicted as a home icon (35, 36) are shown, along with the current location of each respective driver/vehicle device for each delivery event.

The process 590 also includes the enterprise server 102 analyzing and processing the stored delivery event data, on a trip by trip basis, to generate a driver/safety score for each trip (step 760). Various schemes and algorithms may be developed by those skilled in the art to generate a driver/ safety for a trip.

In one example embodiment, each delivery trip is assigned a baseline score of 100 points. The stored delivery event data and delivery event trip report information is analyzed and processed to identify and detected driving events (e.g., high-speed velocity event, hard acceleration/ braking/turning event, speeding violation event). Based on the number and type of detected driving events, a predetermined number of points is deducted from the baseline score for each detected driving event. The number of points assigned to each event may be chosen depending on the importance/risk of the type of detected driving event. For example, an actual speeding violation may be more important from a driver safety standpoint as compared to a hard right turn event, and a speeding violation may be assigned 10 points, while all other events are assigned 3 points. Other point system(s) may be utilized as desired.

In one embodiment, the system includes two models for use in determining a safety score for a given delivery trip: Safety Occurrences model and Speeding model.

The Safety Occurrences model includes the four unsafe acceleration events described above. Each of these events can be given the same weight or different weights, as desired, and the magnitude of the point deduction can be configurable. After completion of the delivery trip, the number of safety occurrences and the points assigned to each type of occurrence are used to calculate a Safety Deduction number.

The Speeding model includes speeding violations. Different types of violations can be configured and different weights can be given or assigned, as desired. Severity of speeding violations can be based on time (e.g., 30 second total time speeding) and magnitude (e.g., 5, 10, 15 mph over the speed threshold). It will be understood that the length of the trip may be factored into the calculation for one or both of the models and weighted accordingly. After completion of the delivery trip, the duration time of speeding (and at what level of severity) are used to calculate a Speeding Deduction number. Then, the Safety Deduction number and Speeding Deduction numbers are added to determine the Overall Deduction per trip.

To illustrate, let us assume for a given delivery trip that 5 Safety Occurrences were detected (each at −2 points and speeding was detected for 3.5 minutes at a threshold of 8 mph over (at −3 points). Based on this, the Safety Deduction would be calculated as 5×−2=−10; and the Speeding Deduction would be calculated as 3.5×−3=−10.5. The Overall Deduction for the trip would be −20.5, and the Overall Trip Score would be 79.5 (using 100 as a baseline at beginning of trip and deducting the Overall Deduction number.

Based on the total number of trips over a given time period (e.g., work shift), a driver's Average Score can be calculated. In addition, an Average Weighted Score based on miles driven for each trip can also be calculated as desired. In one embodiment, the Average Weighted Score is calculated as: Average Weighted Score=100+(sum (deduction*miles))/sum (miles).

As will be appreciated, calculated scores are absolute numbers and do not necessarily reflect or define a good or bad driver. The interpretation of these scores and report may be dependent on the type of store operated, its geographical location (e.g., urban vs rural) and other factors (e.g., the points system utilized).

After this processing, a driver/safety score for the trip is determined (step 765) and may be added as a separate component to the delivery event trip report. As each of the delivery trips are analyzed and scored (i.e., each delivery trip for each driver/vehicle device 108), the driver/safety scores are stored in a delivery trip database that can be organized/ filtered in various ways, including based on identity of the driver/device, store, work shift, day, week, etc. (step 770). Other suitable and desired data associated with a given delivery trip may also be stored in the delivery trip database. In one embodiment, the stored delivery trip data per trip may include customer order ID, date, start and ending time, duration of delivery trip, identity of driver, number and type of each detected driving event (e.g., long stop, speeding violation, hard acceleration/braking/turns).

With reference to FIG. 10, there is shown an example display or screenshot of delivery trip data listing multiple delivery event trips performed by one driver. Each delivery trip shown also provides examples of the additional data and information that may be stored in the delivery trip database within the enterprise server 102. As will be appreciated, the enterprise server 102 may include an application program and interface capabilities enabling the store portal device 104 to access the delivery trip database and obtain, generate, manipulate, filter, sort, select and/or display various delivery trip data at the store. This may be implemented in a webpage-based interface application and client fashion.

Figure 9:
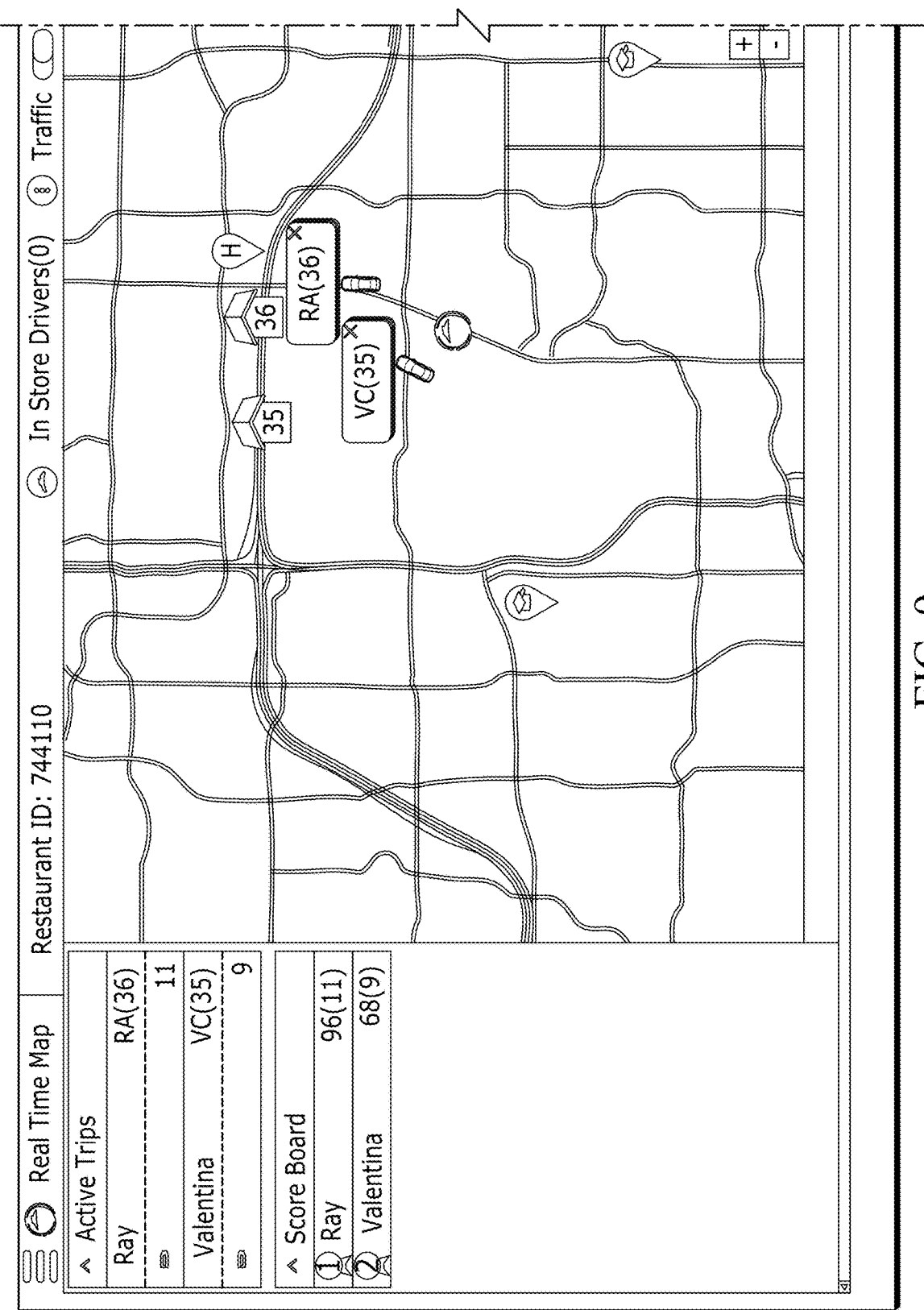
FIG. 9 is an enlarged view of a window pane area or area illustrating a scoreboard feature as shown on the example display or depiction in FIG. 8.

Now referring back to FIG. 8, in addition to the functionality described above with respect to FIG. 10, the real-time tracking as shown in FIG. 8 may further include one or more scoreboard features or functions, which is illustrated more aptly in FIG. 9. On the left side of the display, a side window pane identifies two active delivery drivers (Ray and Valentina) for a given store. One delivery driver has recently completed eleven delivery trips and the other has recently completed nine trips.

Utilization of a scoreboard type of display can instill competitiveness among delivery drivers that results in drivers engaging in safter and better driving actions and habits during delivery. In addition, a reward program could also be implemented to reward drivers based on such competitiveness and/or driver scoring reports and performance assessments. As such, utilization of the systems and methods described herein can positively affect and increase delivery driver safety and awareness.

The enterprise server 102 may include additional functionality and provide various processing to generate other scoring features and results. For example, for each store, the enterprise server 102 may maintain a running score total for each active store driver during a particular shift, day or week. For example, if maintained for each active worker at a store, if there are two active drivers, and one has completed eleven delivery trips (each one scored) and another has completed nine delivery trips (each one scored), the remote server may process this data and transmit scoring data to the store portal device 104 enabling the display of scores and rankings of drivers for each store. As will be appreciated, one example of this is shown in FIG. 9. In this example, the respective scores of "96" and "68" could represent the average score per delivery trip, or may be a running total with points deducted from the baseline of 100. As will be appreciated, other scoring features and calculations may be implemented whereby the enterprise server 102 processes data from the delivery trip database into the desire format/representation for download and display on the store portal device 104.

The process 590 may also include the enterprise server 102 assessing each driver's performance based on one or more driver/safety scores (step 780) (and possibly other delivery event trip data). If the assessed driver performance falls below one or more threshold(s), the enterprise server 102 may recommend training or may perform other actions (step 785).

In one embodiment, when a driver assessment does not meet the threshold(s), the enterprise server 102 will communicate a training recommended message to the store portal device 104 which may be displayed at the store. The message may include a general recommendation (e.g., training is required, but with no specificity) or a specific recommendation (e.g., speeding is a problem, and a particular driver safety course should be taken). In another embodiment, the enterprise server 102 may perform one or more other actions, including (1) suspending login or registration privileges for a delivery driver (which may be maintained until the delivery driver completes a driver safety course), (2) recommending a remedial action or disciplinary action, (3) or performing some other action.

In another embodiment (not shown), the enterprise server 102 is configured to calculate the actual delivery trip miles driven (per trip) during delivery trips, and can be maintained or calculated on a per driver and/or per time period basis (e.g., shift, day, week, month). This is beneficial in applications in which delivery drivers are paid or otherwise reimbursed (e.g., a set mileage allowance) based on the number of miles driven. Instead of reviewing odometer readings or having the delivery driver keep records for each delivery trip, the number of miles driven can be automatically calculated by the enterprise server 102 and transmitted to the store. This may be performed, for example, at the end of a work shift (such as when a driver logs out).

In general, the overall delivery trip report, identified driving event(s), positional tracking information, calculated safety score(s), driver safety training recommendations, etc. are transmitted from the enterprise server 102 to the store POS system 106 (and/or the portal device 104) associated with the customer order and delivery event. Thereafter, the store portal device 104 may display for viewing at the store location any or all of this information (such as the delivery event trip rendering image/video and safety score(s)).

In addition to the foregoing methods, processes and functionality, the driver/vehicle devices 108 themselves may also be configured to (1) receive and display driver/safety scores, (2) receive and display selected detected driving events (as a pop up alert); and (3) receive and display an indication of the need for training due to poor score(s) (as a pop up alert).

Further, the enterprise server functionality may include the ability for a user (e.g., manager, administrator) to select one or a group of stores from all stores and review real-time tracking of active delivery trips and events (as well as selection and playback of past delivery trips).

It will be understood that although the figures and description hereabove may identify various steps and processes as shown taking place in a particular order, these steps and processes may be performed in any order unless it is readily apparent to a person skilled in the art that one step or process must be performed prior to, or after, another step or process. Therefore, the present disclosure and description of the methods and processes herein is not intended to require or otherwise be limited to, any specific order of steps or processes.

What is claimed is:

1. A method for monitoring and detecting unsafe driving events occurring during a delivery trip event for delivery of a product from a home store location to a delivery address, the method comprising:
   detecting, by a wireless communication device, a start of a delivery trip event;
   activating a tracking and safety data collection and transmission process within the wireless communication device, comprising,
      activating one or more sensors and generating sensor data comprising sensor position data for the communication device at a predetermined rate;
      storing the generated sensor position data as delivery trip event data,
      processing at least some of the generated sensor data and detecting a driving event occurring during the delivery trip event, and
      when a driving event is detected, storing detected driving event information as delivery trip event data, wherein the detected driving event information comprises an identifier of the detected driving event and data indicative of a position the driving event occurred;

accumulating delivery trip event data over a predetermined time period;

periodically transmitting, from the wireless communication device, at least some accumulated delivery trip event data to a remote server device during the delivery trip event;

detecting an end of the delivery trip event and deactivating the tracking and safety data collection and transmission process within the wireless communication device; and after detecting the end of the delivery trip event and deactivating the tracking and safety data collection and transmission process, transmitting, from the wireless communication device, at least some remaining accumulated delivery trip event data to the remote server device that has not been previously transmitted during the delivery trip event.

2. The method in accordance with claim 1, wherein the detected driving event is a one of a forward acceleration event, a braking event or a right/left turn acceleration event.

3. The method in accordance with claim 1, wherein detecting a driving event occurring during the delivery trip event comprises:

comparing sensor acceleration data to one or more event thresholds stored in the wireless communication device; and detecting the occurrence when the sensor acceleration data exceeds the one or more event thresholds stored within the wireless communication device.

4. The method in accordance with claim 3, wherein the one or more event thresholds comprise at least one of the following:

greater than about 2 meters/second² for forward acceleration;

greater than about 3 meters/second² for braking; and greater than about 3 meters/second² for right/left turn acceleration.

5. The method in accordance with claim 1, wherein the predetermined time period for accumulating delivery event data equals a period of time between one of the following:

about 1 second and 100 seconds;

about 5 seconds and 30 seconds; or about 8 seconds and 15 seconds.

6. The method in accordance with claim 5, wherein the predetermined rate at which sensor position data is generated is between about 0.1 second and 2 seconds.

7. A communication device for monitoring and detecting driving events occurring during a delivery trip event for delivery of a product from a home store location to a delivery address, the communication device comprising:

memory configured to store data;

one or more sensors configured to:

generate sensor data, the sensor data comprising sensor position data indicative of location of the communication device and sensor acceleration data indicative of acceleration of the communication device;

a processor configured to:

detect a start of a delivery trip event, activate a tracking and safety data collection and transmission process within the wireless communication device, activate the one or more sensors to generate the sensor position data periodically at a predetermined rate and to generate the sensor acceleration data;

store in the memory the generated sensor position data as delivery trip event data, process at least some of the generated sensor data and detect a driving event occurring during the delivery trip event, when a driving event is detected, store detected driving event information as delivery trip event data, wherein the detected driving event information comprises an identifier of the detected driving event and data indicative of a position the driving event occurred, and accumulate delivery trip event data over a predetermined time period and store in the memory;

a wireless transceiver configured to periodically transmit, from the wireless communication device, at least some accumulated delivery trip event data to a remote server device during the delivery trip event; and wherein the processor is further configured to:

detect an end of the delivery trip event, [and]]

deactivate the tracking and safety data collection and transmission process within the wireless communication device; and after detecting the end of the delivery trip event and deactivating the tracking and safety data collection and transmission process, the wireless transceiver is configured to transmit, from the wireless communication device, at least some remaining accumulated delivery trip event data to the remote server device that has not been previously transmitted during the delivery trip event.

8. The communication device in accordance with claim 7, wherein the detected driving event is a one of a forward acceleration event, a braking event or a right/left turn acceleration event.

9. The communication device in accordance with claim 7, wherein to detect a driving event occurring during the delivery trip event, the processor is configured to:

compare the sensor acceleration data to one or more event thresholds stored m the wireless communication device; and detect the occurrence when the sensor acceleration data exceeds the one or more event thresholds stored within the wireless communication device.

10. The communication device in accordance with claim 9, wherein the one or more event thresholds comprise at least one of the following:

greater than about 2 meters/second² for forward acceleration;

greater than about 3 meters/second² for braking; and greater than about 3 meters/second² for right/left turn acceleration.

11. The communication device in accordance with claim 7, wherein the predetermined time period for accumulating delivery event data equals a period of time between one of the following:

about 1 second and 100 seconds;

about 5 seconds and 30 seconds; or about 8 seconds and 15 seconds.

12. The communication device in accordance with claim 11, wherein the predetermined rate at which sensor position data is generated is between about 0.1 second and 2 seconds.

* * * * *